United States Patent
Fang et al.

(10) Patent No.: US 12,001,034 B2
(45) Date of Patent: Jun. 4, 2024

(54) NEAR INFRARED CONTROL COATING, ARTICLES FORMED THEREFROM, AND METHODS OF MAKING THE SAME

(71) Applicant: PPG Industries Ohio, Inc., Cleveland, OH (US)

(72) Inventors: Shuyu Fang, Pittsburgh, PA (US); Eldon L. Decker, Gibsonia, PA (US); Kristen M. Kruszewski, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 26 days.

(21) Appl. No.: 18/052,619

(22) Filed: Nov. 4, 2022

(65) Prior Publication Data
US 2023/0112815 A1 Apr. 13, 2023

Related U.S. Application Data

(62) Division of application No. 16/240,899, filed on Jan. 7, 2019, now Pat. No. 11,561,329.

(51) Int. Cl.
*G02B 5/08* (2006.01)
*G06K 7/10* (2006.01)
*C09D 5/33* (2006.01)

(52) U.S. Cl.
CPC .............. *G02B 5/08* (2013.01); *G06K 7/10* (2013.01); *C09D 5/004* (2013.01); *G02B 5/0808* (2013.01)

(58) Field of Classification Search
None
See application file for complete search history.

(56) References Cited

U.S. PATENT DOCUMENTS

| | | | |
|---|---|---|---|
| 2,395,442 | A | 2/1946 | Ballard |
| 2,659,075 | A | 11/1953 | Collins et al. |
| 2,758,298 | A | 8/1956 | Sunstein |
| 2,901,747 | A | 8/1959 | Sunstein |
| 3,870,528 | A | 3/1975 | Edds et al. |
| 4,148,039 | A | 4/1979 | Lunden |
| 4,157,924 | A | 6/1979 | Elms et al. |
| 4,180,609 | A | 12/1979 | Vassiliou |

(Continued)

FOREIGN PATENT DOCUMENTS

| | | |
|---|---|---|
| AT | 163962 T | 3/1998 |
| AU | 2002320745 A1 | 1/2003 |

(Continued)

OTHER PUBLICATIONS

"Delphi ESR Startup Guide", Version 2.3, Feb. 5, 2019, pp. 77.

(Continued)

*Primary Examiner* — Stephone B Allen
*Assistant Examiner* — Tamara Y. Washington

(57) ABSTRACT

A coating composition for application over a retroreflective substrate, a retroreflective article comprising a coating formed from the coating composition, and a method of production thereof are provided. The coating composition comprises a pigment suitable to absorb and/or scatter electromagnetic radiation in a wavelength range of 800 nm to 2000 nm. The coating comprises a ratio of reduction in electromagnetic radiation retroreflectance at a wavelength of 905 nm and/or 1550 nm to reduction in electromagnetic radiation retroreflectance averaged over a wavelength range of 400 nm to 700 nm of at least 2:1.

20 Claims, 7 Drawing Sheets

(56) References Cited

U.S. PATENT DOCUMENTS

| | | |
|---|---|---|
| 4,186,036 A | 1/1980 | Elms et al. |
| 4,220,675 A | 9/1980 | Imazaki |
| 4,244,741 A | 1/1981 | Kruse |
| 4,415,922 A | 11/1983 | Reymond et al. |
| 4,598,020 A | 7/1986 | Panush |
| 4,714,623 A | 12/1987 | Riccio et al. |
| 4,717,949 A | 1/1988 | Eichenlaub |
| 4,869,532 A | 9/1989 | Abe et al. |
| 4,933,056 A | 6/1990 | Corrigan et al. |
| 5,037,475 A | 8/1991 | Chida et al. |
| 5,039,598 A | 8/1991 | Abramsohn et al. |
| 5,228,009 A | 7/1993 | Forestieri et al. |
| 5,366,252 A | 11/1994 | Nishida et al. |
| 5,389,101 A | 2/1995 | Heilbrun et al. |
| 5,416,058 A | 5/1995 | Uyttendaele et al. |
| 5,503,904 A | 4/1996 | Yoshinaga et al. |
| 5,530,043 A | 6/1996 | Zawacky et al. |
| 5,591,255 A | 1/1997 | Small et al. |
| 5,667,891 A | 9/1997 | Batzar et al. |
| 5,760,107 A | 6/1998 | Valko et al. |
| 5,820,987 A | 10/1998 | Kaufman et al. |
| 5,863,321 A | 1/1999 | Crumley et al. |
| 5,864,626 A | 1/1999 | Braun et al. |
| 5,871,827 A | 2/1999 | Jaffe et al. |
| 5,907,293 A | 5/1999 | Tognazzini |
| 5,910,119 A | 6/1999 | Lin |
| 5,971,767 A | 10/1999 | Kaufman et al. |
| 5,989,642 A | 11/1999 | Singer et al. |
| 6,151,014 A | 11/2000 | Zloter et al. |
| 6,184,279 B1 | 2/2001 | Anderson et al. |
| 6,242,056 B1 | 6/2001 | Spencer et al. |
| 6,245,855 B1 | 6/2001 | Swarup et al. |
| 6,306,505 B1 | 10/2001 | Mauer et al. |
| 6,356,376 B1 | 3/2002 | Tonar et al. |
| 6,366,397 B1 | 4/2002 | Genjima et al. |
| 6,387,519 B1 | 5/2002 | Anderson et al. |
| 6,458,336 B1 | 10/2002 | El-Tamer et al. |
| 6,520,915 B1 | 2/2003 | Lin et al. |
| 6,521,038 B2 | 2/2003 | Yanagimoto et al. |
| 6,525,111 B1 | 2/2003 | Spencer et al. |
| 6,544,596 B2 | 4/2003 | Clemens et al. |
| 6,585,622 B1 | 7/2003 | Shum et al. |
| 6,590,049 B1 | 7/2003 | O'Dwyer et al. |
| 6,623,556 B2 | 9/2003 | Zama et al. |
| 6,657,734 B1 | 12/2003 | Monz et al. |
| 6,700,692 B2 | 3/2004 | Tonar et al. |
| 6,849,338 B2 | 2/2005 | Clemens et al. |
| 6,863,851 B2 | 3/2005 | Josephy et al. |
| 6,875,800 B2 | 4/2005 | Vanier et al. |
| 7,005,472 B2 | 2/2006 | Anderson et al. |
| 7,137,713 B2 | 11/2006 | Harasawa et al. |
| 7,211,324 B2 | 5/2007 | Kamimori et al. |
| 7,241,500 B2 | 7/2007 | Shiao et al. |
| 7,466,415 B2 | 12/2008 | Gibson et al. |
| 7,663,798 B2 | 2/2010 | Tonar et al. |
| 7,820,088 B2 | 10/2010 | Josephy et al. |
| 7,906,199 B2 | 3/2011 | Rearick et al. |
| 7,910,634 B2 | 3/2011 | Desaw et al. |
| 7,954,281 B2 | 6/2011 | Jaster |
| 7,959,981 B2 | 6/2011 | Sadvary et al. |
| 8,006,909 B2 | 8/2011 | Swiler et al. |
| 8,108,169 B2 | 1/2012 | Martin |
| 8,123,850 B2 | 2/2012 | Niewold |
| 8,129,466 B2 | 3/2012 | Polk |
| 8,202,616 B2 | 6/2012 | Suzuki et al. |
| 8,247,761 B1 | 8/2012 | Agrawal et al. |
| 8,362,130 B2 | 1/2013 | Demartin et al. |
| 8,679,617 B2 | 3/2014 | Eibon et al. |
| 8,724,894 B1 | 5/2014 | Jensen et al. |
| 8,784,941 B2 | 7/2014 | Richter et al. |
| 8,822,025 B2 | 9/2014 | Decker et al. |
| 8,835,008 B2 | 9/2014 | Richter et al. |
| 8,841,375 B2 | 9/2014 | Peri et al. |
| 8,846,194 B2 | 9/2014 | Maruoka et al. |
| 9,034,445 B2 | 5/2015 | Edwards et al. |
| 9,056,584 B2 | 6/2015 | Fish et al. |
| 9,056,988 B2 | 6/2015 | Decker et al. |
| 9,057,835 B2 | 6/2015 | Hellring et al. |
| 9,174,239 B2 | 11/2015 | Doessel et al. |
| 9,255,173 B2 | 2/2016 | Edwards |
| 9,369,689 B1 | 6/2016 | Tran et al. |
| 9,482,657 B2 | 11/2016 | Bell et al. |
| 9,598,597 B2 | 3/2017 | Chasser |
| 9,612,369 B2 | 4/2017 | Banerjee et al. |
| 9,658,375 B2 | 5/2017 | Banerjee |
| 9,662,920 B2 | 5/2017 | Kozee et al. |
| 9,664,832 B2 | 5/2017 | Banerjee |
| 9,678,260 B2 | 6/2017 | Banerjee |
| 9,714,361 B2 | 7/2017 | Edwards |
| 9,739,917 B2 | 8/2017 | Banerjee et al. |
| 9,801,693 B1 | 10/2017 | Kim-Whitty |
| 9,810,824 B2 | 11/2017 | Banerjee et al. |
| 9,840,807 B2 | 12/2017 | Luzon |
| 9,850,705 B2 | 12/2017 | Dean et al. |
| 9,880,263 B2 | 1/2018 | Droz et al. |
| 10,023,746 B2 | 7/2018 | Henglein et al. |
| 10,048,415 B2 | 8/2018 | Banerjee et al. |
| 10,131,838 B2 | 11/2018 | Berdahl |
| 10,174,213 B2 | 1/2019 | Kruesemann et al. |
| 10,191,348 B2 | 1/2019 | Luten et al. |
| 10,215,855 B2 | 2/2019 | Decker et al. |
| 10,240,064 B2 | 3/2019 | Kabagambe |
| 10,311,590 B1 | 6/2019 | Ebrahimi et al. |
| 10,373,033 B2 | 8/2019 | Picard et al. |
| 10,502,879 B1 | 12/2019 | Northcott et al. |
| 10,619,053 B2 | 4/2020 | Mcquown et al. |
| 10,641,895 B2 | 5/2020 | Decker et al. |
| 10,690,823 B2 | 6/2020 | Banerjee et al. |
| 10,769,581 B1 | 9/2020 | Brazeau |
| 10,788,608 B2 | 9/2020 | Banerjee et al. |
| 10,870,740 B2 | 12/2020 | Wu et al. |
| 10,901,086 B2 | 1/2021 | Decker et al. |
| 10,927,267 B2 | 2/2021 | Zalich et al. |
| 11,065,843 B2 | 7/2021 | Hoehne et al. |
| 11,086,053 B2 | 8/2021 | Banerjee et al. |
| 11,118,068 B2 | 9/2021 | Mcquown et al. |
| 11,364,668 B2 | 6/2022 | Wells |
| 11,370,925 B2 | 6/2022 | Zalich et al. |
| 11,428,012 B2 | 8/2022 | Daniels et al. |
| 11,461,607 B2 | 10/2022 | Duarte et al. |
| 11,561,329 B2 | 1/2023 | Fang et al. |
| 11,565,476 B2 | 1/2023 | Rumbak et al. |
| 11,578,239 B2 | 2/2023 | Sun et al. |
| 11,584,860 B2 | 2/2023 | Zalich et al. |
| 11,589,964 B2 | 2/2023 | Andersen et al. |
| 11,591,464 B2 | 2/2023 | Lewis et al. |
| 11,617,707 B2 | 4/2023 | Schilling et al. |
| 11,808,833 B2 | 11/2023 | Decker et al. |
| 11,809,933 B2 | 11/2023 | Duarte et al. |
| 2002/0071948 A1 | 6/2002 | Duff et al. |
| 2002/0086115 A1 | 7/2002 | Lamers et al. |
| 2002/0094320 A1 | 7/2002 | Toan et al. |
| 2002/0114955 A1 | 8/2002 | Lamers et al. |
| 2002/0154379 A1 | 10/2002 | Tonar et al. |
| 2002/0186148 A1 | 12/2002 | Trajkovic et al. |
| 2002/0188051 A1 | 12/2002 | Hugo |
| 2003/0030041 A1 | 2/2003 | Genjima et al. |
| 2003/0054160 A1 | 3/2003 | Fisher et al. |
| 2003/0086605 A1 | 5/2003 | Doner |
| 2003/0089171 A1 | 5/2003 | Kenefick et al. |
| 2003/0108689 A1 | 6/2003 | Tan et al. |
| 2003/0125189 A1 | 7/2003 | Castro et al. |
| 2003/0167080 A1 | 9/2003 | Hart et al. |
| 2003/0185993 A1 | 10/2003 | Kamimori et al. |
| 2003/0203991 A1 | 10/2003 | Schottman et al. |
| 2004/0018360 A1 | 1/2004 | Hugo |
| 2004/0037455 A1 | 2/2004 | Klingensmith et al. |
| 2004/0068046 A1 | 4/2004 | Hugo |
| 2004/0142205 A1 | 7/2004 | Chen et al. |
| 2004/0191540 A1 | 9/2004 | Jakobi et al. |
| 2004/0194663 A1 | 10/2004 | Li et al. |
| 2004/0210056 A1 | 10/2004 | Wood et al. |
| 2004/0219214 A1 | 11/2004 | Gravett et al. |
| 2004/0220322 A1 | 11/2004 | Gooding et al. |

(56) References Cited

U.S. PATENT DOCUMENTS

| | | |
|---|---|---|
| 2005/0007645 A1 | 1/2005 | Tonar et al. |
| 2005/0050658 A1 | 3/2005 | Chan et al. |
| 2005/0075551 A1 | 4/2005 | Horn et al. |
| 2005/0080171 A1 | 4/2005 | Reisacher et al. |
| 2005/0090609 A1 | 4/2005 | Reisacher et al. |
| 2005/0109443 A1 | 5/2005 | Sleiman et al. |
| 2005/0120290 A1 | 6/2005 | Mistry et al. |
| 2005/0129871 A1 | 6/2005 | Ruther et al. |
| 2005/0129964 A1 | 6/2005 | Hugo |
| 2005/0154308 A1 | 7/2005 | Quistgaard et al. |
| 2005/0175558 A1 | 8/2005 | Nielson et al. |
| 2005/0186423 A1 | 8/2005 | Johnson et al. |
| 2005/0203395 A1 | 9/2005 | Sui et al. |
| 2005/0215685 A1 | 9/2005 | Haines |
| 2005/0226489 A1 | 10/2005 | Beach et al. |
| 2005/0228112 A1 | 10/2005 | Takahashi et al. |
| 2005/0233135 A1 | 10/2005 | Iyer et al. |
| 2005/0287348 A1 | 12/2005 | Faler et al. |
| 2005/0287354 A1 | 12/2005 | Jennings et al. |
| 2006/0010620 A1 | 1/2006 | Krabbe et al. |
| 2006/0013463 A1 | 1/2006 | Ramsay et al. |
| 2006/0098853 A1 | 5/2006 | Roundhill et al. |
| 2006/0118408 A1 | 6/2006 | Myli et al. |
| 2006/0229407 A1 | 10/2006 | Vogel et al. |
| 2006/0251895 A1 | 11/2006 | Lambert et al. |
| 2007/0000545 A1 | 1/2007 | Cannon et al. |
| 2007/0016372 A1 | 1/2007 | Browne et al. |
| 2007/0032741 A1 | 2/2007 | Hibner et al. |
| 2007/0035561 A1 | 2/2007 | Bachelder et al. |
| 2007/0038083 A1 | 2/2007 | Srinivasan et al. |
| 2007/0051275 A1 | 3/2007 | Muller et al. |
| 2007/0087199 A1 | 4/2007 | Yoshimura et al. |
| 2007/0092738 A1 | 4/2007 | Groenlund et al. |
| 2007/0164117 A1 | 7/2007 | Swiler et al. |
| 2007/0218900 A1 | 9/2007 | Abhyanker |
| 2007/0249778 A1 | 10/2007 | Clemens et al. |
| 2007/0258147 A1 | 11/2007 | Van Der Boom et al. |
| 2008/0075936 A1 | 3/2008 | McGurran et al. |
| 2008/0090207 A1 | 4/2008 | Rubbert |
| 2008/0102270 A1 | 5/2008 | Shiao et al. |
| 2008/0126030 A1 | 5/2008 | Jain et al. |
| 2008/0159591 A1 | 7/2008 | Ruedin |
| 2008/0166309 A1 | 7/2008 | Mcdermott et al. |
| 2008/0171145 A1 | 7/2008 | Stants et al. |
| 2008/0181252 A1 | 7/2008 | Rofougaran |
| 2008/0187708 A1 | 8/2008 | Decker et al. |
| 2008/0188610 A1 | 8/2008 | Polk et al. |
| 2008/0190319 A1 | 8/2008 | Reisacher et al. |
| 2008/0192233 A1 | 8/2008 | Rosania |
| 2008/0199721 A1 | 8/2008 | Scott et al. |
| 2008/0221439 A1 | 9/2008 | Iddan et al. |
| 2008/0267499 A1 | 10/2008 | Deischinger et al. |
| 2008/0293857 A1 | 11/2008 | Crawford et al. |
| 2008/0295737 A1 | 12/2008 | Henglein et al. |
| 2008/0300714 A1 | 12/2008 | Hughes et al. |
| 2008/0319089 A1 | 12/2008 | Muller et al. |
| 2009/0012393 A1 | 1/2009 | Choi |
| 2009/0022998 A1 | 1/2009 | Toth et al. |
| 2009/0042020 A1 | 2/2009 | Ferencz et al. |
| 2009/0068473 A1 | 3/2009 | Van Wessel et al. |
| 2009/0092811 A1 | 4/2009 | Chasser |
| 2009/0098476 A1 | 4/2009 | Denton et al. |
| 2009/0099626 A1 | 4/2009 | de Juan, Jr. et al. |
| 2009/0163785 A1 | 6/2009 | Nelson |
| 2009/0205643 A1 | 8/2009 | Tanaka et al. |
| 2009/0226673 A1 | 9/2009 | Friedersdorf et al. |
| 2009/0268946 A1 | 10/2009 | Zhang et al. |
| 2009/0306755 A1 | 12/2009 | Dickinson et al. |
| 2010/0022696 A1 | 1/2010 | Maruoka et al. |
| 2010/0047620 A1 | 2/2010 | Decker et al. |
| 2010/0076302 A1 | 3/2010 | Gray et al. |
| 2010/0110553 A1 | 5/2010 | Anderson et al. |
| 2010/0139855 A1 | 6/2010 | Edler et al. |
| 2010/0204357 A1 | 8/2010 | Chasser et al. |
| 2010/0204414 A1 | 8/2010 | Chasser et al. |
| 2010/0233461 A1 | 9/2010 | Wood et al. |
| 2010/0277786 A1 | 11/2010 | Anderson et al. |
| 2010/0302093 A1 | 12/2010 | Bunch et al. |
| 2010/0310734 A1 | 12/2010 | Groneberg-Nienstedt |
| 2010/0321758 A1 | 12/2010 | Bugno et al. |
| 2010/0329510 A1 | 12/2010 | Schmid |
| 2011/0027567 A1 | 2/2011 | Kekicheff et al. |
| 2011/0117025 A1 | 5/2011 | Dacosta et al. |
| 2011/0123792 A1 | 5/2011 | Niewold |
| 2011/0130659 A1 | 6/2011 | Cinquin et al. |
| 2011/0151163 A1 | 6/2011 | Bloom et al. |
| 2011/0159813 A1 | 6/2011 | Mallinson et al. |
| 2011/0159921 A1 | 6/2011 | Davis et al. |
| 2011/0194629 A1 | 8/2011 | Bekanich |
| 2011/0199674 A1 | 8/2011 | Melcher et al. |
| 2011/0236673 A1 | 9/2011 | Jennings et al. |
| 2011/0301466 A1 | 12/2011 | Wang et al. |
| 2012/0026459 A1 | 2/2012 | Tucker et al. |
| 2012/0053689 A1 | 3/2012 | Martin et al. |
| 2012/0072188 A1 | 3/2012 | Maerten et al. |
| 2012/0107584 A1 | 5/2012 | Eibon et al. |
| 2012/0147319 A1 | 6/2012 | Corti et al. |
| 2012/0165671 A1 | 6/2012 | Hill et al. |
| 2012/0184846 A1 | 7/2012 | Izatt et al. |
| 2012/0229882 A1 | 9/2012 | Fish et al. |
| 2012/0270986 A1 | 10/2012 | Maruyama et al. |
| 2012/0308724 A1 | 12/2012 | Hellring et al. |
| 2013/0011662 A1 | 1/2013 | Clamer et al. |
| 2013/0048925 A1 | 2/2013 | Edwards et al. |
| 2013/0059164 A1 | 3/2013 | Hofmann et al. |
| 2013/0113763 A1 | 5/2013 | Nungester et al. |
| 2013/0161062 A1 | 6/2013 | Yamaoka et al. |
| 2013/0170013 A1 | 7/2013 | Tonar et al. |
| 2013/0172473 A1 | 7/2013 | Rathschlag et al. |
| 2013/0230477 A1 | 9/2013 | Li et al. |
| 2013/0307935 A1 | 11/2013 | Rappel et al. |
| 2013/0317351 A1 | 11/2013 | Case et al. |
| 2013/0317369 A1 | 11/2013 | Bryant-Greenwood et al. |
| 2013/0324310 A1 | 12/2013 | Leech et al. |
| 2013/0336525 A1 | 12/2013 | Kurtz et al. |
| 2014/0009275 A1 | 1/2014 | Bowers et al. |
| 2014/0072442 A1 | 3/2014 | Bowman et al. |
| 2014/0158950 A1 | 6/2014 | Helms et al. |
| 2014/0160904 A1 | 6/2014 | Decoux et al. |
| 2014/0171786 A1 | 6/2014 | Stagl |
| 2014/0249336 A1 | 9/2014 | Komatsu et al. |
| 2014/0255608 A1 | 9/2014 | Eibon et al. |
| 2014/0275341 A1 | 9/2014 | Edwards |
| 2015/0004424 A1 | 1/2015 | Kruesemann et al. |
| 2015/0024189 A1 | 1/2015 | Imaizumi et al. |
| 2015/0048286 A1 | 2/2015 | Nishio et al. |
| 2015/0069117 A1 | 3/2015 | Rapoport et al. |
| 2015/0080735 A1 | 3/2015 | Hyun et al. |
| 2015/0132477 A1 | 5/2015 | Seong et al. |
| 2015/0148679 A1 | 5/2015 | Thiele et al. |
| 2015/0247040 A1 | 9/2015 | Henglein et al. |
| 2015/0254515 A1 | 9/2015 | Zobel |
| 2015/0329054 A1 | 11/2015 | Neuman et al. |
| 2016/0101642 A1 | 4/2016 | Richert et al. |
| 2016/0108256 A1 | 4/2016 | Yang et al. |
| 2016/0160078 A1 | 6/2016 | Edwards |
| 2016/0178510 A1 | 6/2016 | Meulendijks-Kiggen et al. |
| 2016/0207344 A1 | 7/2016 | Klein et al. |
| 2016/0211464 A1 | 7/2016 | Tanabe et al. |
| 2016/0270656 A1 | 9/2016 | Samec et al. |
| 2016/0291134 A1 | 10/2016 | Droz et al. |
| 2016/0340545 A1 | 11/2016 | Edwards |
| 2016/0360970 A1 | 12/2016 | Tzvieli et al. |
| 2017/0068143 A1 | 3/2017 | Bruizeman et al. |
| 2017/0071577 A1 | 3/2017 | Seo et al. |
| 2017/0132855 A1 | 5/2017 | Kim et al. |
| 2017/0174893 A1 | 6/2017 | Fujita et al. |
| 2017/0192733 A1 | 7/2017 | Huang et al. |
| 2017/0251035 A1 | 8/2017 | Siminoff et al. |
| 2017/0253751 A1 | 9/2017 | Busbee et al. |
| 2017/0261830 A1 | 9/2017 | Luten et al. |
| 2017/0354398 A1 | 12/2017 | Martins |
| 2017/0360401 A1 | 12/2017 | Rothberg et al. |
| 2018/0056690 A1 | 3/2018 | Bollstroem et al. |

(56) References Cited

U.S. PATENT DOCUMENTS

| | | |
|---|---|---|
| 2018/0074238 A1 | 3/2018 | Yoon |
| 2018/0106015 A1 | 4/2018 | Pino et al. |
| 2018/0120435 A1 | 5/2018 | Decker et al. |
| 2018/0127617 A1 | 5/2018 | Kabagambe et al. |
| 2018/0149782 A1 | 5/2018 | Seubert et al. |
| 2018/0188026 A1 | 7/2018 | Zhang et al. |
| 2018/0189550 A1 | 7/2018 | Mccombe et al. |
| 2018/0267382 A1 | 9/2018 | Kwon et al. |
| 2018/0329066 A1 | 11/2018 | Pacala |
| 2018/0370205 A1 | 12/2018 | Markowicz et al. |
| 2019/0015867 A1 | 1/2019 | Fujita et al. |
| 2019/0019411 A1 | 1/2019 | Sweeney et al. |
| 2019/0031889 A1 | 1/2019 | Fujita et al. |
| 2019/0072976 A1 | 3/2019 | Bell et al. |
| 2019/0096215 A1 | 3/2019 | Shahid et al. |
| 2019/0126923 A1 | 5/2019 | Taie et al. |
| 2019/0154831 A1 | 5/2019 | Decker et al. |
| 2019/0176439 A1 | 6/2019 | Hara et al. |
| 2019/0181613 A1 | 6/2019 | Kurosaka et al. |
| 2019/0211211 A1 | 7/2019 | Fujita et al. |
| 2020/0152084 A1 | 5/2020 | Kumar et al. |
| 2020/0216679 A1 | 7/2020 | Fang et al. |
| 2020/0225351 A1 | 7/2020 | Decker et al. |
| 2020/0233123 A1 | 7/2020 | Wheatley |
| 2020/0237326 A1 | 7/2020 | Achatz et al. |
| 2020/0247651 A1 | 8/2020 | Wang et al. |
| 2020/0269770 A1 | 8/2020 | Chang et al. |
| 2020/0301433 A1 | 9/2020 | Katayama et al. |
| 2020/0346640 A1 | 11/2020 | Chang et al. |
| 2020/0364462 A1 | 11/2020 | Imes |
| 2020/0406874 A1 | 12/2020 | Chang et al. |
| 2021/0003405 A1 | 1/2021 | Choi |
| 2021/0040329 A1 | 2/2021 | Decker et al. |
| 2021/0092969 A1 | 4/2021 | Hartwig et al. |
| 2021/0116563 A1 | 4/2021 | Decker et al. |
| 2021/0215517 A1 | 7/2021 | Bensalem |
| 2021/0233408 A1 | 7/2021 | Swan |
| 2021/0243410 A1 | 8/2021 | Ekin |
| 2021/0261152 A1 | 8/2021 | Meijburg et al. |
| 2021/0316659 A1 | 10/2021 | Betz et al. |
| 2021/0327092 A1 | 10/2021 | Jiang et al. |
| 2022/0012555 A1 | 1/2022 | Duarte et al. |
| 2022/0101021 A1 | 3/2022 | Neubecker et al. |
| 2022/0108119 A1 | 4/2022 | Margines et al. |
| 2022/0114273 A1 | 4/2022 | Njemanze |
| 2022/0126873 A1 | 4/2022 | Alghanem et al. |
| 2022/0244740 A1 | 8/2022 | Jiang et al. |
| 2022/0325109 A1 | 10/2022 | Decker et al. |
| 2022/0374667 A1 | 11/2022 | Duarte et al. |
| 2023/0088934 A1 | 3/2023 | Decker et al. |
| 2023/0303855 A1 | 9/2023 | Kingsley et al. |

FOREIGN PATENT DOCUMENTS

| | | |
|---|---|---|
| AU | 2003303513 A1 | 7/2004 |
| AU | 2003297905 A1 | 7/2005 |
| AU | 2020101520 A4 | 9/2020 |
| BR | 7909035 A | 8/1981 |
| BR | PI9408412 A | 8/1997 |
| BR | 102013017136 A2 | 3/2016 |
| CA | 438037 A | 11/1946 |
| CA | 1059316 A | 7/1979 |
| CA | 2178837 A1 | 6/1995 |
| CA | 2511486 A1 | 7/2004 |
| CA | 2773045 A1 | 3/2011 |
| CA | 2906844 A1 | 9/2014 |
| CN | 1173522 A | 2/1998 |
| CN | 302436842 S | 5/2003 |
| CN | 1681894 A | 10/2005 |
| CN | 1756571 A | 4/2006 |
| CN | 100385337 C | 4/2008 |
| CN | 101249045 A | 8/2008 |
| CN | 101525502 A | 9/2009 |
| CN | 101633801 A | 1/2010 |
| CN | 101681440 A | 3/2010 |
| CN | 101975951 A | 2/2011 |
| CN | 301490354 | 3/2011 |
| CN | 301582476 S | 6/2011 |
| CN | 301591040 S | 6/2011 |
| CN | 301591041 S | 6/2011 |
| CN | 301591057 | 6/2011 |
| CN | 102127361 A | 7/2011 |
| CN | 301607136 S | 7/2011 |
| CN | 301607202 S | 7/2011 |
| CN | 301607268 S | 7/2011 |
| CN | 301607293 S | 7/2011 |
| CN | 301624626 S | 7/2011 |
| CN | 301626792 S | 7/2011 |
| CN | 301626804 S | 7/2011 |
| CN | 102164997 A | 8/2011 |
| CN | 301635108 S | 8/2011 |
| CN | 301635265 S | 8/2011 |
| CN | 301642258 S | 8/2011 |
| CN | 301642349 S | 8/2011 |
| CN | 301648454 S | 8/2011 |
| CN | 301648583 S | 8/2011 |
| CN | 301655404 S | 8/2011 |
| CN | 301655434 S | 8/2011 |
| CN | 301655473 S | 8/2011 |
| CN | 301661475 S | 8/2011 |
| CN | 301666323 S | 9/2011 |
| CN | 301666360 S | 9/2011 |
| CN | 301666390 S | 9/2011 |
| CN | 301666429 S | 9/2011 |
| CN | 301673088 S | 9/2011 |
| CN | 301673113 S | 9/2011 |
| CN | 301695310 S | 10/2011 |
| CN | 301695338 S | 10/2011 |
| CN | 301709720 S | 10/2011 |
| CN | 301721695 S | 11/2011 |
| CN | 301825307 S | 2/2012 |
| CN | 301832877 S | 2/2012 |
| CN | 301841121 S | 2/2012 |
| CN | 301841174 S | 2/2012 |
| CN | 301847111 S | 2/2012 |
| CN | 301862097 S | 3/2012 |
| CN | 301862142 | 3/2012 |
| CN | 301873396 S | 3/2012 |
| CN | 301890128 S | 4/2012 |
| CN | 301891840 S | 4/2012 |
| CN | 301891891 S | 4/2012 |
| CN | 301891897 S | 4/2012 |
| CN | 301903048 S | 5/2012 |
| CN | 301903124 S | 5/2012 |
| CN | 301916038 S | 5/2012 |
| CN | 301916052 S | 5/2012 |
| CN | 301923513 S | 5/2012 |
| CN | 301925873 S | 5/2012 |
| CN | 301925874 S | 5/2012 |
| CN | 301941663 S | 5/2012 |
| CN | 301941741 S | 5/2012 |
| CN | 301941749 S | 5/2012 |
| CN | 301941750 S | 5/2012 |
| CN | 301941751 S | 5/2012 |
| CN | 301941770 S | 5/2012 |
| CN | 301941839 S | 5/2012 |
| CN | 301941903 S | 5/2012 |
| CN | 301941955 S | 5/2012 |
| CN | 301941957 S | 5/2012 |
| CN | 301949321 S | 6/2012 |
| CN | 301949365 S | 6/2012 |
| CN | 301949399 S | 6/2012 |
| CN | 301959970 S | 6/2012 |
| CN | 301960091 S | 6/2012 |
| CN | 301968928 S | 6/2012 |
| CN | 301968962 S | 6/2012 |
| CN | 301968967 S | 6/2012 |
| CN | 301969094 S | 6/2012 |
| CN | 301969120 S | 6/2012 |
| CN | 301969149 S | 6/2012 |
| CN | 301969150 S | 6/2012 |
| CN | 301969152 S | 6/2012 |
| CN | 301978685 S | 7/2012 |
| CN | 301978687 S | 7/2012 |

(56) References Cited

FOREIGN PATENT DOCUMENTS

| | | | |
|---|---|---|---|
| CN | 301978699 | S | 7/2012 |
| CN | 301978700 | S | 7/2012 |
| CN | 301978726 | S | 7/2012 |
| CN | 301978812 | S | 7/2012 |
| CN | 302000544 | S | 7/2012 |
| CN | 302000671 | S | 7/2012 |
| CN | 302000695 | S | 7/2012 |
| CN | 302000698 | S | 7/2012 |
| CN | 302000701 | S | 7/2012 |
| CN | 302000768 | S | 7/2012 |
| CN | 302000772 | S | 7/2012 |
| CN | 302000774 | S | 7/2012 |
| CN | 302000872 | S | 7/2012 |
| CN | 302000873 | S | 7/2012 |
| CN | 302000874 | S | 7/2012 |
| CN | 302000924 | S | 7/2012 |
| CN | 302000979 | S | 7/2012 |
| CN | 302011969 | S | 7/2012 |
| CN | 302012100 | S | 7/2012 |
| CN | 302030028 | S | 8/2012 |
| CN | 302031957 | S | 8/2012 |
| CN | 302031986 | S | 8/2012 |
| CN | 302032176 | S | 8/2012 |
| CN | 302035638 | S | 8/2012 |
| CN | 302045389 | S | 8/2012 |
| CN | 302045468 | S | 8/2012 |
| CN | 102675917 | A | 9/2012 |
| CN | 302065225 | S | 9/2012 |
| CN | 302065283 | S | 9/2012 |
| CN | 302093519 | S | 9/2012 |
| CN | 102712821 | A | 10/2012 |
| CN | 302112909 | S | 10/2012 |
| CN | 302112939 | S | 10/2012 |
| CN | 302133529 | S | 10/2012 |
| CN | 302144445 | S | 10/2012 |
| CN | 302144446 | S | 10/2012 |
| CN | 302166516 | S | 11/2012 |
| CN | 302222318 | S | 12/2012 |
| CN | 302233616 | S | 12/2012 |
| CN | 302256458 | S | 12/2012 |
| CN | 302256526 | S | 12/2012 |
| CN | 302270149 | S | 1/2013 |
| CN | 302270177 | S | 1/2013 |
| CN | 302270201 | S | 1/2013 |
| CN | 302281104 | S | 1/2013 |
| CN | 302281235 | S | 1/2013 |
| CN | 302281254 | S | 1/2013 |
| CN | 302291573 | S | 1/2013 |
| CN | 302291660 | S | 1/2013 |
| CN | 302301060 | S | 1/2013 |
| CN | 302301062 | S | 1/2013 |
| CN | 302301085 | S | 1/2013 |
| CN | 302301086 | S | 1/2013 |
| CN | 302334400 | S | 2/2013 |
| CN | 102964469 | A | 3/2013 |
| CN | 302342829 | S | 3/2013 |
| CN | 302363188 | S | 3/2013 |
| CN | 302374231 | S | 3/2013 |
| CN | 302374268 | S | 3/2013 |
| CN | 302374288 | S | 3/2013 |
| CN | 302374289 | S | 3/2013 |
| CN | 302374290 | S | 3/2013 |
| CN | 302384814 | S | 4/2013 |
| CN | 302384902 | S | 4/2013 |
| CN | 302394704 | S | 4/2013 |
| CN | 302416729 | S | 4/2013 |
| CN | 302416821 | S | 4/2013 |
| CN | 302416830 | S | 4/2013 |
| CN | 302416838 | S | 4/2013 |
| CN | 302416846 | S | 4/2013 |
| CN | 302416849 | S | 4/2013 |
| CN | 302436843 | S | 5/2013 |
| CN | 302436844 | S | 5/2013 |
| CN | 302436903 | S | 5/2013 |
| CN | 302436915 | S | 5/2013 |
| CN | 302436930 | S | 5/2013 |
| CN | 302441983 | S | 5/2013 |
| CN | 302458116 | S | 6/2013 |
| CN | 302469967 | S | 6/2013 |
| CN | 302477494 | S | 6/2013 |
| CN | 103221491 | A | 7/2013 |
| CN | 302505773 | S | 7/2013 |
| CN | 302511866 | S | 7/2013 |
| CN | 302696254 | S | 12/2013 |
| CN | 302721977 | | 1/2014 |
| CN | 203424965 | U | 2/2014 |
| CN | 103649239 | A | 3/2014 |
| CN | 302925540 | S | 8/2014 |
| CN | 302954351 | S | 10/2014 |
| CN | 104212286 | A | 12/2014 |
| CN | 303051440 | S | 12/2014 |
| CN | 303113025 | S | 2/2015 |
| CN | 104693704 | A | 6/2015 |
| CN | 104789101 | A | 7/2015 |
| CN | 303310734 | S | 7/2015 |
| CN | 105164175 | A | 12/2015 |
| CN | 204899530 | U | 12/2015 |
| CN | 303511001 | S | 12/2015 |
| CN | 105246991 | A | 1/2016 |
| CN | 303586581 | S | 2/2016 |
| CN | 303606842 | S | 3/2016 |
| CN | 303623760 | S | 3/2016 |
| CN | 205433734 | U | 8/2016 |
| CN | 205541424 | U | 8/2016 |
| CN | 106084962 | A | 11/2016 |
| CN | 106619891 | A | 5/2017 |
| CN | 206236172 | U | 6/2017 |
| CN | 304157728 | S | 6/2017 |
| CN | 106926830 | A | 7/2017 |
| CN | 107124613 | A | 9/2017 |
| CN | 304275911 | S | 9/2017 |
| CN | 304328781 | S | 10/2017 |
| CN | 304334069 | S | 10/2017 |
| CN | 107383573 | A | 11/2017 |
| CN | 304355021 | S | 11/2017 |
| CN | 304355040 | S | 11/2017 |
| CN | 304456286 | S | 1/2018 |
| CN | 304525850 | S | 3/2018 |
| CN | 304572439 | S | 4/2018 |
| CN | 108116334 | A | 6/2018 |
| CN | 304830464 | S | 9/2018 |
| CN | 108656783 | A | 10/2018 |
| CN | 108896021 | A | 11/2018 |
| CN | 109384257 | A | 2/2019 |
| CN | 109679412 | A | 4/2019 |
| CN | 305126450 | S | 4/2019 |
| CN | 305167208 | S | 5/2019 |
| CN | 305190233 | S | 5/2019 |
| CN | 109945973 | A | 6/2019 |
| CN | 305287504 | S | 8/2019 |
| CN | 305422145 | S | 11/2019 |
| CN | 305486959 | S | 12/2019 |
| CN | 110696170 | A | 1/2020 |
| CN | 110705485 | A | 1/2020 |
| CN | 305646550 | S | 3/2020 |
| CN | 111402194 | A | 7/2020 |
| CN | 305906704 | S | 7/2020 |
| CN | 306025411 | S | 9/2020 |
| CN | 306025413 | S | 9/2020 |
| CN | 306304265 | S | 1/2021 |
| CN | 306425203 | S | 3/2021 |
| CN | 112656580 | A | 4/2021 |
| CN | 112785724 | A | 5/2021 |
| CN | 306514827 | S | 5/2021 |
| CN | 306534437 | S | 5/2021 |
| CN | 113030952 | A | 6/2021 |
| CN | 306614703 | S | 6/2021 |
| CN | 306848937 | S | 9/2021 |
| CN | 306944385 | | 11/2021 |
| CN | 306980688 | S | 12/2021 |
| CN | 307021142 | S | 12/2021 |
| CN | 307021176 | S | 12/2021 |
| CN | 307096360 | S | 2/2022 |
| CN | 307137411 | S | 3/2022 |

(56) References Cited

FOREIGN PATENT DOCUMENTS

| | | |
|---|---|---|
| CN | 307161678 S | 3/2022 |
| CN | 307283309 S | 4/2022 |
| CN | 114566276 A | 5/2022 |
| CN | 307429088 S | 7/2022 |
| CN | 307429089 S | 7/2022 |
| CN | 307429090 S | 7/2022 |
| CN | 307441509 S | 7/2022 |
| CN | 307441510 S | 7/2022 |
| CN | 307444047 S | 7/2022 |
| CN | 307527862 S | 9/2022 |
| CN | 307615331 S | 10/2022 |
| CN | 115956105 A | 4/2023 |
| DE | 2315259 A1 | 10/1973 |
| DE | 2222871 A1 | 11/1973 |
| DE | 3339571 A1 | 5/1985 |
| DE | 3803893 A1 | 8/1989 |
| DE | 19630813 A1 | 3/1997 |
| DE | 19716672 C1 | 6/1998 |
| DE | 19739262 A1 | 3/1999 |
| DE | 19739263 A1 | 3/1999 |
| DE | 19834194 A1 | 2/2000 |
| DE | 10306576 A1 | 8/2004 |
| DE | 10343704 A1 | 4/2005 |
| DE | 202004016363 U1 | 3/2006 |
| DE | 102005061684 A1 | 6/2007 |
| DE | 202007007421 U1 | 8/2007 |
| DE | 102007062945 A1 | 6/2009 |
| DE | 102008059867 A1 | 3/2010 |
| DE | 102010029169 A1 | 11/2011 |
| DE | 202013006851 U1 | 9/2013 |
| EP | 0046746 A1 | 3/1982 |
| EP | 0552047 A1 | 7/1993 |
| EP | 0736073 A1 | 10/1996 |
| EP | 0813911 A2 | 12/1997 |
| EP | 0869158 A2 | 10/1998 |
| EP | 0992965 A2 | 4/2000 |
| EP | 1284278 A2 | 2/2003 |
| EP | 1047960 B1 | 7/2003 |
| EP | 1583561 A2 | 10/2005 |
| EP | 1938864 A1 | 7/2008 |
| EP | 3578611 A1 | 11/2012 |
| EP | 2756042 A1 | 7/2014 |
| EP | 2783921 A1 | 10/2014 |
| EP | 2947630 A1 | 11/2015 |
| EP | 2970712 A1 | 1/2016 |
| EP | 3239251 A1 | 11/2017 |
| EP | 2798022 B1 | 11/2018 |
| EP | 3842292 A1 | 6/2021 |
| ES | 2116720 T3 | 7/1998 |
| FR | 1523766 A | 5/1968 |
| FR | 2775860 A1 | 9/1999 |
| GB | 0661245 A | 11/1951 |
| GB | 0729546 A | 5/1955 |
| GB | 0821583 A | 10/1959 |
| IN | 307274 A | 4/2013 |
| JP | 56-501277 A | 9/1981 |
| JP | 6044027 B2 | 10/1985 |
| JP | 61-074679 A | 4/1986 |
| JP | 63-048674 A | 3/1988 |
| JP | 03-023224 A | 1/1991 |
| JP | 04-083255 A | 3/1992 |
| JP | 09-507089 A | 7/1997 |
| JP | 09-234982 A | 9/1997 |
| JP | 09-269575 A | 10/1997 |
| JP | 09-323064 A | 12/1997 |
| JP | 2001-290429 A | 10/2001 |
| JP | 2002-060698 A | 2/2002 |
| JP | 2002-071911 A | 3/2002 |
| JP | 2002-177872 A | 6/2002 |
| JP | 2002-205006 A | 7/2002 |
| JP | 2002-205007 A | 7/2002 |
| JP | 2004-016568 A | 1/2004 |
| JP | 3527329 B2 | 5/2004 |
| JP | 2004-174469 A | 6/2004 |
| JP | 2004-244516 A | 9/2004 |
| JP | 2005-076019 A | 3/2005 |
| JP | 2005-090204 A | 4/2005 |
| JP | 2005-097462 A | 4/2005 |
| JP | 3107864 U | 4/2005 |
| JP | 2005-523981 A | 8/2005 |
| JP | 2006-008874 A | 1/2006 |
| JP | 3731831 B2 | 1/2006 |
| JP | 3798038 B2 | 7/2006 |
| JP | 2006-519766 A | 8/2006 |
| JP | 2007-332223 A | 12/2007 |
| JP | 4156948 B2 | 9/2008 |
| JP | 2009-102626 A | 5/2009 |
| JP | 2009-114468 A | 5/2009 |
| JP | 2010-173217 A | 8/2010 |
| JP | 2011-026543 A | 2/2011 |
| JP | 3165729 U | 2/2011 |
| JP | 2011-225652 A | 11/2011 |
| JP | 2012-036331 A | 2/2012 |
| JP | 5205062 B2 | 6/2013 |
| JP | 2014-210856 A | 11/2014 |
| JP | 2014-530233 A | 11/2014 |
| JP | 2015-093434 A | 5/2015 |
| JP | 5744720 B2 | 7/2015 |
| JP | 2016-518475 A | 6/2016 |
| JP | 2016-531441 A | 10/2016 |
| JP | 2016-200626 A | 12/2016 |
| JP | 6064869 B2 | 1/2017 |
| JP | 2017-138110 A | 8/2017 |
| JP | 6181984 B2 | 8/2017 |
| JP | 2017-211744 A | 11/2017 |
| JP | 2017-220585 A | 12/2017 |
| JP | 6323932 B2 | 5/2018 |
| JP | 6542217 B2 | 7/2019 |
| KR | 10-1999-0072923 A | 9/1999 |
| KR | 10-2000-0067910 A | 11/2000 |
| KR | 10-0294304 B1 | 9/2001 |
| KR | 10-2003-0064755 A | 8/2003 |
| KR | 10-2003-0064756 A | 8/2003 |
| KR | 10-2005-0106055 A | 11/2005 |
| KR | 10-0545438 B1 | 1/2006 |
| KR | 10-2006-0015276 A | 2/2006 |
| KR | 10-0562607 B1 | 3/2006 |
| KR | 10-0791959 B1 | 1/2008 |
| KR | 10-2008-0035811 A | 4/2008 |
| KR | 10-2008-0059259 A | 6/2008 |
| KR | 10-2008-0067700 A | 7/2008 |
| KR | 10-0863828 B1 | 10/2008 |
| KR | 10-2009-0008219 A | 1/2009 |
| KR | 10-2009-0009736 A | 1/2009 |
| KR | 10-0887788 B1 | 3/2009 |
| KR | 10-0933526 B1 | 12/2009 |
| KR | 10-1111420 B1 | 2/2012 |
| KR | 10-1114272 B1 | 3/2012 |
| KR | 10-2013-0039336 A | 4/2013 |
| KR | 10-2013-0062944 A | 6/2013 |
| KR | 10-2013-0088987 A | 8/2013 |
| KR | 10-2013-0105607 A | 9/2013 |
| KR | 10-2013-0128431 A | 11/2013 |
| KR | 10-2014-0037772 A | 3/2014 |
| KR | 10-1410145 B1 | 6/2014 |
| KR | 10-1444604 B1 | 9/2014 |
| KR | 10-2015-0119137 A | 10/2015 |
| KR | 10-2016-0034577 A | 3/2016 |
| KR | 10-2018-0101128 A | 9/2018 |
| KR | 10-1931272 B1 | 12/2018 |
| MX | 2007016506 A | 10/2008 |
| MX | 2015013146 A | 5/2016 |
| RU | 2380085 C2 | 1/2010 |
| RU | 2487899 C2 | 7/2013 |
| RU | 2012104143 A | 8/2013 |
| RU | 2494838 C2 | 10/2013 |
| RU | 2016122271 A | 12/2017 |
| RU | 2662522 C2 | 7/2018 |
| SU | 1390205 A1 | 4/1988 |
| UA | 95546 U | 12/2014 |
| WO | 81/00972 A1 | 4/1981 |
| WO | 87/04952 A1 | 8/1987 |
| WO | 95/16069 A1 | 6/1995 |
| WO | 95/17475 A1 | 6/1995 |

(56) References Cited

FOREIGN PATENT DOCUMENTS

| | | |
|---|---|---|
| WO | 97/00295 A1 | 1/1997 |
| WO | 97/23573 A1 | 7/1997 |
| WO | 98/39915 A1 | 9/1998 |
| WO | 98/47949 A1 | 10/1998 |
| WO | 99/37410 A1 | 7/1999 |
| WO | 00/15351 A1 | 3/2000 |
| WO | 00/29210 A1 | 5/2000 |
| WO | 01/40329 A1 | 6/2001 |
| WO | 01/68540 A2 | 9/2001 |
| WO | 02/43881 A1 | 6/2002 |
| WO | 03/06299 A2 | 1/2003 |
| WO | 03/14228 A1 | 2/2003 |
| WO | 03/64540 A1 | 8/2003 |
| WO | 03/66743 A1 | 8/2003 |
| WO | 03/95385 A1 | 11/2003 |
| WO | 2004/000903 A1 | 12/2003 |
| WO | 2004/029159 A1 | 4/2004 |
| WO | 2004/033563 A2 | 4/2004 |
| WO | 2004/046251 A2 | 6/2004 |
| WO | 2004/050770 A1 | 6/2004 |
| WO | 2004/060405 A2 | 7/2004 |
| WO | 2004/071472 A1 | 8/2004 |
| WO | 2004/074382 A2 | 9/2004 |
| WO | 2004/075624 A2 | 9/2004 |
| WO | 2004/088707 A1 | 10/2004 |
| WO | 2005/060922 A1 | 7/2005 |
| WO | 2005/078023 A2 | 8/2005 |
| WO | 2006/009873 A1 | 1/2006 |
| WO | 2006/028130 A1 | 3/2006 |
| WO | 2006/029145 A2 | 3/2006 |
| WO | 2006/046117 A1 | 5/2006 |
| WO | 2007/007521 A1 | 1/2007 |
| WO | 2008/064904 A1 | 6/2008 |
| WO | 2008/088605 A2 | 7/2008 |
| WO | 2008/097895 A2 | 8/2008 |
| WO | 2009/018074 A1 | 2/2009 |
| WO | 2009/044861 A1 | 4/2009 |
| WO | 2011/056564 A2 | 5/2011 |
| WO | 2011/058966 A1 | 5/2011 |
| WO | 2012/075369 A1 | 6/2012 |
| WO | 2012/083183 A2 | 6/2012 |
| WO | 2012019081 A2 | 9/2012 |
| WO | 2013/037928 A1 | 3/2013 |
| WO | 2013127054 A1 | 9/2013 |
| WO | 2014/053932 A1 | 4/2014 |
| WO | 2014/093428 A2 | 6/2014 |
| WO | 2014/152722 A1 | 9/2014 |
| WO | 2014/153054 A1 | 9/2014 |
| WO | 2014157645 A1 | 10/2014 |
| WO | 2015/016716 A1 | 2/2015 |
| WO | 2015/132301 A1 | 9/2015 |
| WO | 2015/192321 A1 | 12/2015 |
| WO | 2016/085992 A1 | 6/2016 |
| WO | 2016/170330 A1 | 10/2016 |
| WO | 2017/006314 A1 | 1/2017 |
| WO | 2017/011250 A1 | 1/2017 |
| WO | 2017/127708 A1 | 7/2017 |
| WO | 20180005088 A1 | 1/2018 |
| WO | 2018/038645 A1 | 3/2018 |
| WO | 2018/081613 A1 | 5/2018 |
| WO | 2019/063341 A1 | 4/2019 |
| WO | 2019/065316 A1 | 4/2019 |
| WO | 2019/084534 A1 | 5/2019 |
| WO | 2019/155068 A1 | 8/2019 |
| WO | 2019/155072 A1 | 8/2019 |
| WO | 2020/095554 A1 | 5/2020 |
| WO | 2020/099151 A1 | 5/2020 |
| WO | 2020/208134 A1 | 10/2020 |
| WO | 2021/035660 A1 | 3/2021 |
| WO | 2021/069518 A1 | 4/2021 |
| WO | 2021/221334 A1 | 11/2021 |
| WO | 2022/207766 A1 | 10/2022 |
| WO | 2022/226395 A1 | 10/2022 |

OTHER PUBLICATIONS

Bae et al., "Environmentally friendly orange pigments based on hexagonal perovskite-type compounds and their high NIR reflectivity", Dyes and Pigments, vol. 147, 2017, pp. 523-528.
Combined Chinese Office Action and Search Report dated Aug. 24, 2015 in Patent Application No. 201280044928.9 (with English language translation and English translation of categories of cited documents).
European Search Report dated Jan. 24, 2012 in European Patent Application No. 11 18 1548.6 Filed Sep. 16, 2011.
InData Systems, "Invisible and Fluorescing Bar Code Printing and Reading", http://www.uvreaders.com/documents/449.pdf.
International Preliminary Report on Patentability received for PCT Patent Application No. PCT/IB2020/050068, mailed on Jul. 22, 2021, 10 pages.
International Preliminary Report on Patentability received for PCT Patent Application No. PCT/US17/58832, mailed on May 9, 2019, 8 pages.
International Preliminary Report on Patentability received for PCT Patent Application No. PCT/US2019/060897, mailed on May 18, 2021, 10 pages.
International Preliminary Report on Patentability received for PCT Patent Application No. PCT/US2020/045430, mailed on Feb. 17, 2022, 9 pages.
International Search Report and Written Opinion received for PCT Patent Application No. PCT/IB2020/050068, mailed on Mar. 24, 2020, 13 pages.
International Search Report and Written Opinion received for PCT Patent Application No. PCT/US17/58832, mailed on Jan. 25, 2018, 9 pages.
International Search Report and Written Opinion received for PCT Patent Application No. PCT/US2019/060897, mailed on Apr. 24, 2020, 13 pages.
International Search Report and Written Opinion received for PCT Patent Application No. PCT/US2020/045430, mailed on Nov. 16, 2020, 12 Pages.
International Search Report dated Nov. 20, 2012 in PCT/EP12/068025 Filed Sep. 14, 2012.
Japanese Office Action dated Jan. 10, 2017 in Patent Application No. 2014-530233 (English Translation only).
Japanese Office Action dated May 30, 2016 in Patent Application No. 2014-530233 (English translation only).
Kim et al., "The use of visible and near-infrared spectroscopy for the analysis of soil water repellency", European Journal of Soil Science, May 2014, vol. 65, pp. 360-368.
Leon et al., "Preliminary studies by visible and near-infrared reflectance spectroscopy of juvenile and adult olive (*Olea europaea* L.) leaves", Journal of the Science of Food and Agriculture, vol. 86, Issue 6, Apr. 30, 2006, pp. 999-1004.
Liu et al., "Preparation of multifunctional locomotive coatings", Xiandai Tuliao Yu Tuzhuang (2012), 15(9), 6-9 CODEN: XTYTAL; ISSN: 1007-9548.
Morisawa et al., "Monitoring of a Calcination Reaction of High Reflective Green-Black (HRGB) Pigments by Using Near-Infrared Electronic Spectroscopy: Calcination Temperature-Dependent Crystal Structural Changes of Their Components and Calibration of the Extent of the Reaction", Applied Spectroscopy, vol. 66, No. 6, 2012, pp. 665-672.
Non-Final Office Action received for U.S. Appl. No. 16/536,655, mailed on Dec. 14, 2021, 14 pages.
Non-Final Office Action received for U.S. Appl. No. 16/240,899, mailed on Apr. 1, 2021, 13 pages.
Non-Final Office Action received for U.S. Appl. No. 16/240,899, mailed on Nov. 29, 2021, 11 pages.
Non-Final Office Action received for U.S. Appl. No. 16/830,719, mailed on Jun. 26, 2020, 8 pages.
Non-Final Office Action received for U.S. Appl. No. 17/126,593, mailed on Jun. 27, 2022, 11 pages.
Non-Final Office Action received for U.S. Appl. No. 17/293,813, mailed on Dec. 16, 2021, 12 pages.

(56) References Cited

OTHER PUBLICATIONS

Non-Final Office Action received for U.S. Appl. No. 17/879,279, mailed on Dec. 6, 2022, 5 pages.
Notice of Allowance received for U.S. Appl. No. 16/240,899, mailed on Aug. 24, 2022, 2 pages.
Notice of Allowance received for U.S. Appl. No. 16/240,899, mailed on Jun. 30, 2022, 8 pages.
Notice of Allowance received for U.S. Appl. No. 16/240,899, mailed on Oct. 3, 2022, 8 pages.
Notice of Allowance received for U.S. Appl. No. 16/240,899, mailed on Sep. 9, 2022, 2 pages.
Notice of Allowance received for U.S. Appl. No. 16/830,719, mailed on Sep. 18, 2020, 8 pages.
Notice of Allowance received for U.S. Appl. No. 17/126,593, mailed on Apr. 19, 2023, 9 pages.
Notice of Allowance received for U.S. Appl. No. 17/126,593, mailed on Dec. 7, 2022, 9 pages.
Notice of Allowance received for U.S. Appl. No. 17/293,813, mailed on Aug. 31, 2022, 2 pages.
Notice of Allowance received for U.S. Appl. No. 17/293,813, mailed on May 11, 2022, 9 pages.
Notice of Allowance received for U.S. Appl. No. 17/879,279, mailed on Mar. 15, 2023, 8 pages.
Notice of Allowance received for U.S. Appl. No. 17/879,279, mailed on May 5, 2023, 9 pages.
Office Action received for Australian Patent Application No. 2020327937, mailed on Aug. 28, 2023, 4 pages.
Office Action received for Australian Patent Application No. 2020327937, mailed on Feb. 24, 2023, 4 pages.
Office Action received for Canada Patent Application No. 3119767, mailed on Jul. 15, 2022, 3 pages.
Office Action received for Canadian Patent Application No. 3125519, mailed on Sep. 16, 2022, 3 pages.
Office Action received for Canadian Patent Application No. 3147210, mailed on Feb. 20, 2023, 5 pages.
Office Action received for Chinese Patent Application No. 201780066470.X, mailed on Apr. 28, 2023, 8 pages (4 pages of English Translation and 4 pages of Original Document).
Office Action received for Chinese Patent Application No. 201780066470.X, mailed on Oct. 8, 2022, 25 pages (12 pages of English Translation and 13 pages of Original Document).
Office Action received for Chinese Patent Application No. 201980074721.8, mailed on Apr. 22, 2023, 18 pages (10 pages of English Translation and 8 pages of Original Document).
Office Action received for Chinese Patent Application No. 202080008236.3, mailed on Dec. 1, 2022, 9 pages (5 pages of English Translation and 4 pages of Original Document).
Adachi et al., "Absorption and scattering of near-infrared light by dispersed lanthanum hexaboride nanoparticles for solar control filters," J. Mater. Res. 2010, vol. 25, No. 3, pp. 510-521.
Office Action received for European Patent Application No. 2070664.3, mailed on Jun. 1, 2022, 8 pages.
Pages 383 and 384 of ASTM E308-06, "Standard Practice for Computing the Colors of Objects by Using the CIE System", ASTM International, West Conshohocken, PA 2006, www.astm.org.

Office Action received for European Patent Application No. 19836176.8, mailed on May 31, 2022, 6 pages.
Office Action received for European Patent Application No. 20701664.3, mailed on Feb. 1, 2023, 7 pages.
Office Action received for European Patent Application No. 20761404.1, mailed on Feb. 15, 2023, 8 pages.
Office Action received for Indian Patent Application No. 202217006419, mailed on Oct. 31, 2023, 4 pages.
Opthentic Corporation, "Invisible Barcodes and QR-codes", https://opthentic.com/technology/invisible_barcodes_qr-codes.
Pfeiffer "Analysis and optimization of radomes for automotive radar sensors", Sep. 22, 2009, pp. 234.
Pfeiffer et al., "Inductive Compensation of High-Permittivity Coatings on Automobile Long-Range Radar Radomes", IEEE Transactions on Microwave Theory and Techniques, vol. 57, No. 11, Nov. 2009, pp. 2627-2632.
Restriction Requirement received for U.S. Appl. No. 16/240,899, mailed on Dec. 16, 2020, 9 pages.
Restriction Requirement received for U.S. Appl. No. 16/536,655, mailed on Aug. 24, 2021, 14 pages.
Sivaramakrishnan et al., "Carbon nanotube-coated surface acoustic wave sensor for carbon dioxide sensing", Sensors and Actuators B, vol. 132, 2008, pp. 296-304.
Suzuki E. M., "Infrared Spectra of U.S. Automobile Original Finishes (1998-2000). IX. Identification of Bismuth Oxychloride and Silver/White Mica Pearlescent Pigments Using Extended Range FT-IR Spectroscopy, XRF Spectrometry, and SEM/EDS Analysis*", J Forensic Sci, Sep. 2014, vol. 59, No. 5, 21 Pages.
Tanimoto et al., "A Note on the Examination of Silverpoint Drawings by Near-Infrared Reflectography", Studies in Conservation, vol. 54, 2009, pp. 106-116.
Office Action received for European Patent Application No. 19836176.8, mailed on Jan. 23, 2023, 6 pages.
Office Action received for Chinese Patent Application No. 202080057258.9, mailed on Jun. 24, 2022, 30 pages (19 pages of English Translation and 11 pages of Original Document).
Office Action received for Chinese Patent Application No. 202080057258.9, mailed on Apr. 8, 2023, 13 pages (7 pages of English Translation and 6 pages of Original Document).
Li et al., "Laser Principle, Technology and Application," Harbin Industrial University Press, 2004, pp. 358-367.
Office Action received for Chinese Patent Application No. 201780066470.X, mailed on Nov. 13, 2023, 33 pages (11 pages of English Translation and 22 pages of Original Document).
Office Action received for Chinese Patent Application No. 202080057258.9, mailed on Sep. 19, 2023, 10 pages (4 pages of English Translation and 6 pages of Original Document).
Office Action received for European Patent Application No. 20701664.3, mailed on Jan. 17, 2024, 7 pages.
Office Action received for European Patent Application No. 20701664.3, mailed on Jun. 21, 2023, 6 pages.
Office Action received for European Patent Application No. 20761404.1, mailed on Aug. 28, 2023, 3 pages.
Weng., "Expressway Electromechanical System," China Communications Press, 2000, pp. 52-53.

NEAR INFRARED CONTROL COATING, ARTICLES FORMED THEREFROM, AND METHODS OF MAKING THE SAME

CROSS-REFERENCE TO RELATED APPLICATIONS

This Application is a divisional application of U.S. patent application Ser. No. 16/240,899, filed Jan. 7, 2019, the contents of which are hereby incorporated by reference.

FIELD

A coating composition for application over a retroreflective substrate, a retroreflective article comprising a coating formed from the coating composition, and a method of production thereof are provided. The present disclosure can relate to reduction in near infrared (NIR) transmittance by the coating.

BACKGROUND

Autonomous vehicles can use various sensor systems such as, cameras, radar, and LIDAR (Light Imaging, Detection, and Ranging), to detect and locate obstacles in order to safely navigate through an environment. Typically, a LIDAR system includes a NIR source to emit NIR electromagnetic radiation and a NIR detector to detect NIR electromagnetic radiation reflected by the obstacle. A NIR electromagnetic radiation source can comprise, for example, a light emitting diode, a laser diode, or any light source that can be capable of emitting NIR electromagnetic radiation. A NIR detector may be a semiconductor detector that can be capable of sensing NIR electromagnetic radiation, such as, a photodiode, a silicon-based charged-coupled device, an indium gallium arsenide detector, a lead sulfide detector, and a lead selenide detector. Some obstacles may present detection challenges for some LIDAR systems.

SUMMARY

The present disclosure provides a coating composition for application over a retroreflective substrate. The coating can comprise a resin and a pigment. The pigment can be suitable to absorb and/or scatter electromagnetic radiation in a wavelength range of 800 nm to 2000 nm. A coating formed from the coating composition can comprise a ratio of reduction in electromagnetic radiation retroreflectance at a wavelength of 905 nm and/or 1550 nm to reduction in electromagnetic radiation retroreflectance averaged over a wavelength range of 400 nm to 700 nm of at least 2:1.

The present disclosure also provides a method for producing a retroreflective article with reduced electromagnetic radiation retroreflection at a wavelength of 905 nm and/or 1550 nm. A coating composition may be deposited over a retroreflective substrate to form a coating. The coating composition can comprise a resin and a pigment. The pigment can be suitable to absorb and/or scatter electromagnetic radiation in a wavelength range of 800 nm to 2000 nm. The coating can comprise a ratio of reduction in electromagnetic radiation retroreflectance at a wavelength of 905 nm and/or 1550 nm to reduction in electromagnetic radiation retroreflectance averaged over a wavelength range of 400 nm to 700 nm of at least 2:1.

The present disclosure also provides a retroreflective article. The article can comprise a retroreflective substrate and a coating disposed over the retroreflective substrate. The coating can comprise a resin and a pigment. The pigment can be suitable to absorb and/or scatter electromagnetic radiation in a wavelength range of 800 nm to 2000 nm. The coating can comprise a ratio of reduction in electromagnetic radiation retroreflectance at a wavelength of 905 nm and/or 1550 nm to reduction in electromagnetic radiation retroreflectance averaged over a wavelength range of 400 nm to 700 nm of at least 2:1.

It is understood that the inventions described in this specification are not limited to the examples summarized in this Summary. Various other aspects are described and exemplified herein.

BRIEF DESCRIPTION OF THE DRAWINGS

The features and advantages of the examples, and the manner of attaining them, will become more apparent, and the examples will be better understood by reference to the following description of examples taken in conjunction with the accompanying drawings, wherein.

Corresponding reference characters indicate corresponding parts throughout the several views. The exemplifications set out herein illustrate certain examples, in one form, and such exemplifications are not to be construed as limiting the scope of the examples in any manner.

DETAILED DESCRIPTION

Figure 1:
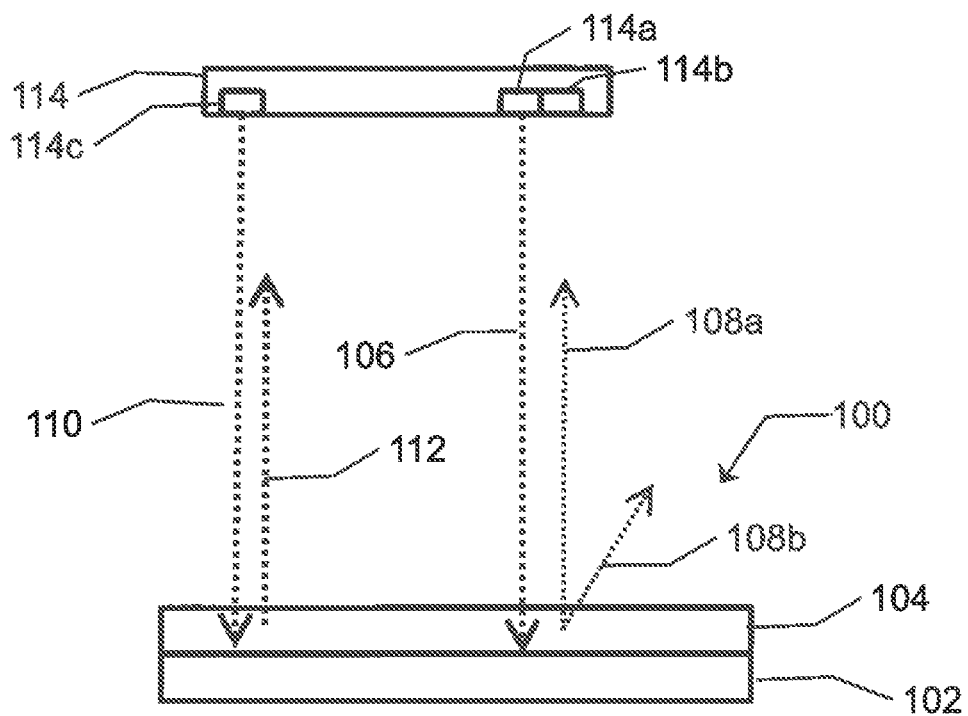
FIG. 1 is a schematic diagram illustrating a retroreflective article with a coating according to the present disclosure.

Certain exemplary examples of the present disclosure will now be described to provide an overall understanding of the principles of the composition, function, manufacture, and use of the compositions and methods disclosed herein. One or more examples are illustrated in the accompanying drawings. Those of ordinary skill in the art will understand that the compositions, articles, and methods specifically described herein and illustrated in the accompanying drawings are non-limiting exemplary examples and that the scope of the various examples of the present invention is defined solely by the claims. The features illustrated or described in connection with one exemplary example may be combined with the features of other examples. Such modifications and variations are intended to be included within the scope of the present invention.

Reference throughout the specification to "various examples," "some examples," "one example," "an example," or the like, means that a particular feature, structure, or characteristic described in connection with the example is included in at least one example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in one or more examples. Thus, the particular features, structures, or characteristics illustrated or described in connection with one example may be combined, in whole or in part, with the features, structures, or characteristics of one or more other examples without limitation. Such modifications and variations are intended to be included within the scope of the present examples.

As used in this specification, particularly in connection with coating layers or films, the terms "on," "onto," "over," and variants thereof (e.g., "applied over," "formed over," "deposited over," "provided over," "located over," and the like) mean applied, formed, deposited, provided, or otherwise located over a surface of a substrate but not necessarily in contact with the surface of the substrate. For example, a coating layer "applied over" a substrate does not preclude the presence of one or more other coating layers of the same or different composition located between the applied coating layer and the substrate. Likewise, a second coating layer "applied over" a first coating layer does not preclude the presence of one or more other coating layers of the same or different composition located between the applied second coating layer and the applied first coating layer.

As used in this specification, the terms "polymer" and "polymeric" means prepolymers, oligomers, and both homopolymers and copolymers. As used in this specification, "prepolymer" means a polymer precursor capable of further reactions or polymerization by one or more reactive groups to form a higher molecular mass or cross-linked state.

As used in this specification, the terms "cure" and "curing" refer to the chemical crosslinking of components in a coating composition applied as a coating layer over a substrate. Accordingly, the terms "cure" and "curing" do not encompass solely physical drying of coating compositions through solvent or carrier evaporation. In this regard, the term "cured," as used in this specification, refers to the condition of a coating layer in which a component of the coating composition forming the layer has chemically reacted to form new covalent bonds in the coating layer (e.g., new covalent bonds formed between a binder resin and a curing agent).

As used in this specification, the term "formed" refers to the creation of an object from a composition by a suitable process, such as, curing. For example, a coating formed from a curable coating composition refers to the creation of a single or multiple layered coating or coated article from the curable coating composition by curing the coating composition under suitable process conditions.

Retroreflective substrates have been used on various articles, such as, for example, a tape, a sign, a vehicle, a marker, and clothing, in order to increase their visibility upon illumination at night. The increased visibility can enhance the ability of a driver to see the sign, including the retroreflective substrate (e.g., a stop sign, a yield sign, a one-way sign), or a person wearing clothing, including the retroreflective substrate. The increased visibility can enable the driver to safely observe the article and navigate around the article or person.

A retroreflective substrate operates by receiving electromagnetic radiation from an electromagnetic radiation source and reflecting the received electromagnetic radiation back to the electromagnetic source in the anti-parallel direction it was received. For example, electromagnetic radiation received by a retroreflective substrate traveling in a source vector can be reflected back along a return vector substantially parallel to the source vector but in the opposite direction of the source vector.

As used herein, the term "retroreflectance" means the ability of an article to reflect electromagnetic radiation in a return vector that is substantially parallel but opposite to a source vector and/or the ability of a coating to permit the reflectance of electromagnetic radiation by the article in a return vector that is substantially parallel but opposite to a source vector. As used herein, the term "reflectance" means the returning or throwing back of electromagnetic radiation by a surface upon which the electromagnetic radiation is incident. As used herein, the term "extinction" means the absorbing and/or scattering of electromagnetic radiation.

As used herein, the terms "near infrared range" or "NIR" refer to the near infrared range of the electromagnetic spectrum. For example, the NIR range may have a wavelength range of 800 nm to 2000 nm, such as, 800 nm to 1600 nm. The NIR range may include a wavelength of 905 nm and/or 1550 nm. As used herein, the term "visible" refers to the visible range of the electromagnetic spectrum. For example, the visible range may be a wavelength range of 400 nm to 700 nm.

As used herein, the term "NIR retroreflectance" means the ability of an article to retroreflect electromagnetic radiation in the NIR range of the electromagnetic spectrum and/or the ability of a coating to permit the retroreflectance of the article in the NIR range of the electromagnetic spectrum. As used herein, the term "visible retroreflectance" means the ability of an article to retroreflect electromagnetic radiation in the visible range of the electromagnetic spectrum and/or the ability of a coating to permit the retroreflectance of the article in the visible range of the electromagnetic spectrum. As used herein, the term "NIR extinction" means the ability of a coating to absorb and/or scatter electromagnetic radiation in the NIR range of the electromagnetic spectrum. As used herein, the term "visible extinction" means the ability of a coating to absorb and/or scatter electromagnetic radiation in the visible range of the electromagnetic spectrum.

It can be a challenge for LIDAR systems to properly detect the size and position of a retroreflective substrate because the retroreflective substrate may reflect more NIR electromagnetic radiation back to the LIDAR system than a similarly positioned and sized non-retroreflective substrate. The increased reflectance can result in system saturation that may lead to an improper calculation by the LIDAR system. As a result, the article that employs the retroreflective substrate may appear to the LIDAR system to be larger than a similarly positioned and sized non-retroreflective substrate. The improper calculation can lead to inaccurate mapping of an environment by the LIDAR system and, thus, inaccurate navigation by an autonomous vehicle employing the LIDAR system.

Provided herein are retroreflective substrates, coatings for application over a retroreflective substrate, retroreflective articles comprising the coating, and methods of production thereof. The coatings of the present disclosure can reduce the NIR retroreflectance of the retroreflective substrate and/or the NIR extinction of the coating while maintaining a sufficient level of visible retroreflectance and/or visible extinction of the coating. The coatings can also enable autonomous vehicles to more accurately detect and calculate the size and/or position of the retroreflective substrate while still providing sufficient visible retroreflectance and/or extinction of the coating and minimizing a visible color change in the underlying substrate.

As illustrated in FIG. 1, a retroreflective article 100 comprising a retroreflective substrate 102 and a coating 104 disposed on the retroreflective substrate 102 is provided. The coating 104 can be suitable to scatter and/or absorb electromagnetic radiation in the NIR range. The coating 104 can reduce NIR retroreflectance of the retroreflective substrate 102. The article can be, for example, at least one of a tape, a sign, a vehicle, a marker, clothing, and any obstacle that may be located in a path of a moving vehicle. A marker can comprise at least one of a barrier, a barricade, a speed bump, a traffic cone, a road surface, and the like. A vehicle can comprise any type of moving vehicle, such as, at least one of an automobile, a bicycle, a truck, a bus, an airplane, a boat, a drone, a submarine, and the like.

The retroreflective substrate 102 can comprise, for example, metal, plastic, ceramic, fabric, wood, cement, asphalt, glass, stone, and combinations thereof. The metal can comprise tin, tin alloy, aluminum, aluminum alloy, iron, and iron alloy, and combinations thereof. The plastic can comprise a polymeric material, such as, polyester, polyolefin, polyamide, cellulosic, polystyrene, polyacrylic, poly(ethylene naphthalate), polypropylene, polyethylene, nylon, ethylene vinyl alcohol, polylactic acid, poly(ethyleneterephthalate), polycarbonate, polycarbonate acrylobutadiene styrene, polyamide, and combinations thereof.

The retroreflective substrate 102 can be at least partially coated with a coating composition of the present disclosure to form coating 104. Coating compositions of the present disclosure can be formulated as a solvent-based composition, a water-based composition, or a 100% solid composition that does not comprise a volatile solvent or aqueous carrier. The coating compositions of the present disclosure can be a liquid at a temperature of −10° C. or greater, such as, 0° C. or greater, 10° C. or greater, 30° C. or greater, 40° C. or greater, or 50° C. or greater, can be a liquid at a temperature of 60° C. or lower, such as, 50° C. or lower, 40° C. or lower, 30° C. or lower, 10° C. or lower, or 0° C. or lower, and can be a liquid at a temperature in a range of −10° C. to 60° C., such as, −10° C. to 50° C., −10° C. to 40° C., −10° C. to 30° C., or 0° C. to 40° C. For example, the coating compositions of the present disclosure can be a liquid at room temperature.

The coating compositions of the present disclosure can comprise a resin such as, a film-forming resin. The film-forming resin can include a resin that can form a self-supporting continuous film on surface of a substrate (e.g., retroreflective substrate 102) upon removal of any diluents or carriers present with the film-forming resin or upon curing at ambient or elevated temperature. A film-forming resin can comprise, for example, at least one of an automotive original equipment manufacturer coating composition, an automotive refinish coating composition, an industrial coating composition, an architectural coating composition, a coil coating composition, a packaging coating composition, a marine coating composition, and an aerospace coating composition, and the like.

The film-forming resin can comprise at least one of a thermosetting film-forming resin and a thermoplastic film-forming resin. As used herein, the term "thermosetting" refers to resins that "set" irreversibly upon curing or cross-linking, where the polymer chains of the polymeric components are joined together by covalent bonds, which is often induced, for example, by heat or radiation. Curing or a crosslinking reaction can be carried out under ambient conditions. Once cured or crosslinked, a thermosetting film-forming resin may not melt upon the application of heat and can be insoluble in conventional solvents. As used herein, the term "thermoplastic" refers to resins that include polymeric components that are not joined by covalent bonds and thereby can undergo liquid flow upon heating and are soluble in conventional solvents.

Thermosetting coating compositions may include a cross-linking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

A film-forming resin may have functional groups that are reactive with the crosslinking agent. The film-forming resin in the coating compositions described herein may be selected from any of a variety of polymers well-known in the art. The film-forming resin may be selected from, for example, acrylic polymers, polyester polymers, polyurethane polymers, polyamide polymers, polyether polymers, polysiloxane polymers, copolymers thereof, and mixtures thereof. Generally, these polymers may be any polymers of these types made by any method known to those skilled in the art. The functional groups on the film-forming resin may be selected from any of a variety of reactive functional groups, including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof.

The coating compositions of the present disclosure can comprise a pigment suitable to reduce NIR transmittance and/or increase NIR extinction of the coating 104 formed therefrom and/or reduce NIR retroreflectance of the article 100. As used herein, the term "pigment" refers to inorganic or organic materials which are practically insoluble in the medium in which they are incorporated. The pigment can comprise various compounds that can absorb and/or scatter NIR electromagnetic radiation and the pigment can minimally, if at all, absorb and/or scatter visible electromagnetic radiation. The pigment can absorb NIR electromagnetic radiation and minimally, if at all, scatter NIR electromagnetic radiation. The pigment can scatter NIR electromagnetic radiation and minimally, if at all, absorb NIR electromagnetic radiation. The pigment can both scatter NIR electromagnetic radiation and absorb NIR electromagnetic radiation. The pigment can comprise, for example, at least one of zinc oxide, alumina, antimony tin oxide, tungsten oxide (reduced or unreduced), gold nanoparticles, silver nanoparticles, copper nanoparticles, lanthanum hexaboride, dicopper hydroxide phosphate, and a phthalocyanine. For example, the pigment can comprise or consist essentially of lanthanum hexaboride. The nanoparticles can be spherical, rod-shaped, and/or tube-shaped. The preference of the pigment to absorb and/or scatter NIR electromagnetic radiation can enable the coating composition and coating 104 formed therefrom to reduce NIR transmittance while maintaining sufficient visible transmittance.

The average particle size of the pigment can affect the NIR extinction of the coating 104, the visible extinction of the coating 104, the NIR retroreflectance of the article 100, the visible retroreflectance of the article 100, and/or the observable color of the retroreflective substrate 102. The average particle size of the pigment can be 1 nm or greater such as, 10 nm or greater, 50 nm or greater, 100 nm or greater, 200 nm or greater, 500 nm or greater, or 1000 nm or greater. The average particle size of the pigment can be 5000 nm or lower, such as, 1000 nm or lower, 500 nm or lower, 200 nm lower, 100 nm or lower, 50 nm or lower, or 10 nm or lower. The average particle size of the pigment can be in a range of 1 nm to 5000 nm, such as, 1 nm to 1000 nm, 1 nm to 500 nm, 10 nm to 500 nm, 10 nm to 150 nm, or 10 nm to 100 nm. Decreasing the average particle size of the pigment can increase a ratio of reduction in NIR transmittance to reduction in visible transmittance by the pigment.

As used herein, "average particle size" refers to the z-average size measured using dynamic light scattering which is the intensity-weighted harmonic mean particle diameter. Average particle size according to the present disclosure can be measured according to ASTM E2490.

In order to make the coating composition, a pigment composition comprising the pigment can be combined with the film-forming resin. The pigment composition can be formed by at least one of grinding and milling a pigment source material in order to reduce the particle size of the pigment. For example, the average particle size of the pigment can be reduced to 5000 nm or lower, such as, a reduction to 1000 nm or lower, a reduction to 500 nm or lower, a reduction to 200 nm or lower, a reduction to 100 nm or lower, or a reduction to 50 nm or lower. For example, the average particle size can be reduced to a range of 10 nm to 5000 nm, such as, 10 nm to 1000 nm, 10 nm to 500 nm, 10 nm to 200 nm, 10 nm to 100 nm, or 100 nm to 500 nm.

The pigment composition and film-forming resin can be mixed to homogenize the components and form the coating composition. The coating composition can be stored before use. The coating composition can be curable.

The coating compositions of the present disclosure can be formulated with a liquid viscosity suitable for atomization and droplet formation under the high shear conditions associated with single or multiple component airless spray application techniques at a temperature −10° C. or greater such as, a temperature of 0° C. or greater, a temperature of 10° C. or greater, a temperature of 30° C. or greater, a temperature of 40° C. or greater, or a temperature of 50° C. or greater. The compositions can be formulated with a liquid viscosity suitable for atomization and droplet formation under the high shear conditions associated with single or multiple component airless spray application techniques at a temperature of 60° C. or lower such as, 50° C. or lower, 40° C. or lower, 30° C. or lower, 10° C. or lower, or 0° C. or lower. Compositions of the present disclosure can be formulated with a liquid viscosity suitable for atomization and droplet formation under the high shear conditions associated with single or multiple component airless spray application techniques in a temperature range of −10° C. to 60° C. such as, −10° C. to 50° C., −10° C. to 40° C., −10° C. to 30° C., or 10° C. to 40° C.

The coating compositions of the present disclosure can be deposited over the retroreflective substrate 102 either in situ, after the article 100 is already on location, or as part of the manufacturing process of the article 100. For example, compositions of the present disclosure can be applied as an application over 5% or greater of an exterior surface area of the retroreflective substrate 102, such as, 10% or greater, 20% or greater, 50% or greater, 70% or greater, 90% or greater, or 99% or greater, of an exterior surface area of the retroreflective substrate 102. For example, the coating compositions can cover 100% or less of an exterior surface area of the retroreflective substrate 102, such as, 99% or less, 90% or less, 70% or less, 50% or less, 20% or less, or 10% or less, of an exterior surface area of the retroreflective substrate 102. For example, the coating compositions can cover 5% to 100% of an exterior surface area of the retroreflective substrate 102, such as, 5% to 99%, 5% to 90%, 5% to 70%, or 50% to 100%, of an exterior surface area of the retroreflective substrate 102.

By way of example, if the article 100 is a street sign, the coating composition of the present disclosure may be applied on-site and form a coating over an existing and already installed street sign. Where the article 100 is a newly manufactured street sign, the coating composition of the present disclosure may be applied as part of the manufacturing process of the street sign prior to on-site installation of the sign. Where the article 100 is newly manufactured clothing, the coating composition of the present disclosure may be applied as part of the manufacturing process of the clothing. The coating composition of the present disclosure may be manufactured into a preformed film and thereafter applied to the article 100.

The coating composition can be deposited by at least one of spray coating, spin coating, dip coating, roll coating, flow coating, and film coating. After deposition of the coating composition to the retroreflective substrate 102, the coating composition may be allowed to coalesce to form a substantially continuous film on the retroreflective substrate 102 and the coating composition can be cured to form the coating 104. The coating composition can be cured at a temperature of −10° C. or greater such as, 0° C. or greater, 10° C. or greater, 20° C. or greater, 60° C. or greater, 100° C. or greater, 140° C. or greater, or 160° C. or greater. The coating composition can be cured at a temperature of 175° C. or lower such as, 160° C. or lower, 140° C. or lower, 100° C. or lower, 60° C. or lower, 20° C. or lower, 10° C. or lower, or 0° C. or lower. The coating composition can be cured at a temperature in a range of −10° C. to 175° C. such as, −10° C. to 160° C., 0° C. to 175° C., 10° C. to 175° C., 20° C. to 175° C., 60° C. to 175° C., 10° C. to 100° C., 20° C. to 60° C., or 60° C. to 140° C. The curing can comprise a thermal bake in an oven.

The dry film thickness of the coating 104 can be 0.2 μm or greater, such as, 0.25 μm or greater, 2 μm or greater, 10 μm or greater, 23 μm or greater, 50 μm or greater, or 130 μm or greater. The dry film thickness of the coating 104 can be 500 μm or less, such as, 130 μm or less, 50 μm or less, 23 μm or less, 10 μm or less, 2 μm or less, or 0.25 μm or less. The dry film thickness of the coating 104 can be in a range of 0.2 μm to 500 μm, such as, 0.25 μm to 130 μm, 2 μm to 50 μm, or 10 μm to 23 μm. The dry film thickness of the coating 104 can affect the absorption and/or scattering of NIR electromagnetic radiation by the coating 104.

The coating 104 may be a single layer or a multilayer coating system, such as a coating system including at least two coating layers, a first coating layer and a second coating layer underneath at least a portion of the first coating layer. The retroreflective article 100 can comprise additional layers, such as, a clear coat, a primer, and combinations thereof. Compositions of the present disclosure can be deposited directly on a surface of the retroreflective substrate 102 or over a primer or other underlying layer.

The coating 104 can be substantially clear. As used herein, the term "substantially clear" refers to a coating that has a minimal, if any, scattering or diffuse reflection of visible electromagnetic radiation. The coating 104 can be colorless. The coating 104 may include a colorant; however, in such cases, the colorant is not present in an amount sufficient to render the coating 104 opaque.

As stated herein, the coating 104 can be suitable to reduce NIR retroreflectance of the retroreflective substrate 102. For example, a source 114 can comprise a NIR electromagnetic radiation source 114a and emit NIR electromagnetic radiation 106, which can be absorbed by the coating 104, can be scattered as diffuse NIR electromagnetic radiation 108*b* upon traversing the coating 104, and/or can reach the retroreflective substrate 102. The NIR electromagnetic radiation 106 that reaches the retroreflective substrate 102 can be reflected back through the coating 104 to the source 114 as returned NIR electromagnetic radiation 108*a*. The returned NIR electromagnetic radiation 108*a* can be traveling in a first vector substantially parallel to a second vector that NIR electromagnetic radiation 106 is traveling. The first vector can be in a direction opposite of a direction of the second vector. The diffuse NIR electromagnetic radiation 108*b* may not return to source 114.

The source 114 can comprise a NIR detector 114*b*. The returned NIR electromagnetic radiation 108*a* can be sensed by NIR detector 114*b*. Due to the absorption and/or scattering of the NIR electromagnetic radiation 106 by the coating 104, the returned NIR electromagnetic radiation 108*a* has a reduced magnitude compared to a magnitude of the NIR electromagnetic radiation 106. The reduced magnitude can prevent the NIR detector 114*b* from becoming saturated with NIR electromagnetic radiation.

As illustrated in FIG. 1, the source 114 can comprise a visible electromagnetic radiation source 114*c* and emit visible electromagnetic radiation 110, which may be substantially unaffected by the coating 104. The visible electromagnetic radiation 110 can reach the retroreflective substrate 102 and can be reflected back through the coating 104 to the source 114 as returned visible electromagnetic radiation 112. The returned visible electromagnetic radiation 112 can be traveling in a third vector substantially parallel to the direction of a fourth vector that visible electromagnetic radiation 110 is traveling. The third vector can be in a direction opposite of a direction of the fourth vector. The visible electromagnetic radiation source 114*c* can be a component of the same system as or a component of a different system from the NIR electromagnetic radiation source 114*a*. The source 114 can comprise an automobile, the visible electromagnetic radiation source 114*c* can comprise a headlight of the automobile, and the NIR electromagnetic radiation source 114*a* and NIR detector 114*b* can be part of a LIDAR system.

Due to the minimal, if any, absorption or scattering of the visible electromagnetic radiation 110 by the coating 104 the returned visible electromagnetic radiation 112 has a substantially similar magnitude compared to a magnitude of the visible electromagnetic radiation 110. The substantially similar magnitude can enable observation of the retroreflective substrate 102 by an operator and/or a visible electromagnetic radiation detector.

The coating 104 can be suitable to scatter and/or absorb NIR electromagnetic radiation and reduce the NIR retroreflectance of the retroreflective substrate 102. The NIR retroreflectance of the retroreflective substrate 102 can be reduced by 20% or greater such as, reduced by 30% or greater, reduced by 40% or greater, reduced by 50% or greater, reduced by 60% or greater, reduced by 70% or greater, reduced by 80% or greater, reduced by 90% or greater, or reduced by 99% or greater. The NIR retroreflectance of the retroreflective substrate 102 can be reduced by 100% or lower, such as, reduced by 99% or lower, reduced by 90% or lower, reduced by 80% or lower, reduced by 70% or lower, reduced by 60% or lower, reduced by 50% or lower, reduced by 40% or lower, or reduced by 30% or lower. The reduction in NIR retroreflectance of the retroreflective substrate 102 can be in a range of 20% to 100%, such as, 20% to 99%, 20% to 90%, 20% to 80%, 20% to 70%, 20% to 50%, 20% to 30%, 30% to 100%, 30% to 99%, 30% to 90%, 30% to 70%, 50% to 100%, 50% to 90%, 50% to 99%, 70% to 90%, 70% to 99%, or 70% to 100%.

The NIR retroreflectance of the retroreflective substrate 102 can be reduced in a wavelength range of 800 nm to 2000 nm, such as, 800 nm to 1600 nm. The NIR retroreflectance of the retroreflective substrate 102 can be reduced at various NIR wavelengths, such as, 905 nm and/or 1550 nm. The coating 104 can absorb and/or scatter the 905 nm wavelength and/or the 1550 nm wavelength. The coating 104 can comprise a 905 nm absorbance of 0.05 absorbance unit(s) (Au) or greater such as, 0.1 Au or greater, 0.2 Au or greater, 0.3 Au or greater, 0.4 Au or greater, 0.5 Au or greater, 0.6 Au or greater, 0.7 Au or greater, 0.8 Au or greater, 0.9 Au or greater, 1 Au or greater, or 2 Au or greater. The coating 104 can comprise a 905 nm absorbance of 2 Au or lower, such as, 1 Au or lower, 0.9 Au or lower, 0.8 Au or lower, 0.7 Au or lower, 0.6 Au or lower, 0.5 Au or lower, 0.4 Au or lower, 0.3 Au or lower, 0.2 Au or lower, or 0.1 Au or lower. The coating 104 can comprise a 905 nm absorbance in the range of 0.05 Au to 2 Au such as, 0.1 Au to 2 Au, 0.2 Au to 2 Au, 0.4 Au to 2 Au, 0.6 Au to 2 Au, 0.8 Au to 2 Au, 0.1 Au to 0.9 Au, 0.2 Au to 0.9 Au, 0.4 Au to 0.9 Au, 0.6 Au to 0.9 Au, 0.2 Au to 0.8 Au, or 0.3 Au to 0.8 Au.

The coating 104 can comprise a 1550 nm absorbance of 0.05 Au or greater such as, 0.1 Au or greater, 0.2 Au or greater, 0.3 Au or greater, 0.4 Au or greater, 0.5 Au or greater, 0.6 Au or greater, 0.7 Au or greater, 0.8 Au or greater, 0.9 Au or greater, or 2 Au or greater. The coating 104 can comprise a 1550 nm absorbance of 2 Au or lower, such as, 1 Au or lower, 0.9 Au or lower, 0.8 Au or lower, 0.7 Au or lower, 0.6 Au or lower, 0.5 Au or lower, 0.4 Au or lower, 0.3 Au or lower, 0.2 Au or lower, or 0.1 Au or lower. The coating 104 can comprise a 1550 nm absorbance in the range of 0.05 Au to 2 Au such as, 0.1 Au to 2 Au, 0.2 Au to 2 Au, 0.4 Au to 2 Au, 0.6 Au to 2 Au, 0.8 Au to 2 Au, 0.1 Au to 0.9 Au, 0.2 Au to 0.9 Au, 0.4 Au to 0.9 Au, 0.6 Au to 0.9 Au, 0.2 Au to 0.8 Au, or 0.3 Au to 0.8 Au.

As used herein, an "absorbance unit" or "Au" refers to a base 10 logarithm of a ratio of the electromagnetic radiation received by a substance to the electromagnetic radiation transmitted by the substance.

Minimal, if any, absorption or scattering of visible electromagnetic radiation by the coating 104 coupled with substantial adsorption and/or scattering of NIR electromagnetic radiation by the coating 104, can enable the coating 104 to reduce the NIR retroreflectance of the retroreflective substrate 102 greater than the visible retroreflectance of the retroreflective substrate 102. The coating 104 can comprise a ratio of reduction in electromagnetic radiation retroreflectance at a wavelength of 905 nm and/or 1550 nm to reduction in electromagnetic radiation retroreflectance averaged over a wavelength range of 400 nm to 700 nm of 2:1 or greater, such as, 4:1 or greater, 10:1 or greater, or 20:1 or greater. The coating 104 can comprise a ratio of reduction in electromagnetic radiation retroreflectance at a wavelength of 905 nm and/or 1550 nm to reduction in electromagnetic radiation retroreflectance averaged over a wavelength range of 400 nm to 700 nm of 40:1 or lower, such as, 20:1 or lower, 10:1 or lower, or 4:1 or lower. The coating 104 can comprise a ratio of reduction in electromagnetic radiation retroreflectance at a wavelength of 905 nm and/or 1550 nm to reduction in electromagnetic radiation retroreflectance averaged over a wavelength range of 400 nm to 700 nm of 2:1 to 40:1 such as, 2:1 to 20:1, 2:1 to 10:1, 2:1 to 4:1, 4:1 to 20:1, 4:1 to 10:1, 10:1 to 20:1, or 10:1 to 40:1. The reduction in electromagnetic radiation retroreflectance can be based on the retroreflectance of the retroreflective substrate 102 devoid of the coating 104. For example, the reduction in retroreflectance can be determined by measuring the retroreflectance of the retroreflective substrate 102 devoid of the coating 104, measuring the retroreflectance of the article 100 comprising both the retroreflective substrate 102 and the coating 104, and determining the difference between the two measurements.

The coating 104 can comprise a ratio of electromagnetic radiation extinction at a wavelength of 905 nm and/or 1550 nm to electromagnetic radiation extinction averaged over a wavelength range of 400 nm to 700 nm of 2:1 or greater, such as, 4:1 or greater, 10:1 or greater, or 20:1 or greater. The coating 104 can comprise a ratio of electromagnetic radiation extinction at a wavelength of 905 nm and/or 1550 nm to electromagnetic radiation extinction averaged over a wavelength range of 400 nm to 700 nm of 40:1 or lower, such as, 20:1 or lower, 10:1 or lower, or 4:1 or lower. The coating 104 can comprise a ratio of electromagnetic radiation extinction at a wavelength of 905 nm and/or 1550 nm to electromagnetic radiation extinction averaged over a wavelength range of 400 nm to 700 nm of 2:1 to 40:1 such as, 2:1 to 20:1, 2:1 to 10:1, 2:1 to 4:1, 4:1 to 20:1, 4:1 to 10:1, 10:1 to 20:1, or 10:1 to 40:1.

The reduction in electromagnetic radiation retroreflectance in the NIR range and the increase in electromagnetic extinction can be a result of NIR absorption and/or NIR scattering. The coating 104 can comprise a ratio of electromagnetic radiation absorption at a wavelength of 905 nm and/or 1550 nm to electromagnetic radiation absorption averaged over a wavelength range of 400 nm to 700 nm of 2:1 or greater, such as, 4:1 or greater, 10:1 or greater, or 20:1 or greater. The coating 104 can comprise a ratio of electromagnetic radiation absorption at a wavelength of 905 nm and/or 1550 nm to electromagnetic radiation absorption averaged over a wavelength range of 400 nm to 700 nm of 40:1 or lower, such as, 20:1 or lower, 10:1 or lower, or 4:1 or lower. The coating 104 can comprise a ratio of electromagnetic radiation absorption at a wavelength of 905 nm and/or 1550 nm to electromagnetic radiation absorption averaged over a wavelength range of 400 nm to 700 nm of 2:1 to 40:1 such as, 2:1 to 20:1, 2:1 to 10:1, 2:1 to 4:1, 4:1 to 20:1, 4:1 to 10:1, 10:1 to 20:1, or 10:1 to 40:1.

The coating 104 can comprise a ratio of electromagnetic radiation scattering at a wavelength of 905 nm and/or 1550 nm to electromagnetic radiation scattering averaged over a wavelength range of 400 nm to 700 nm of at least 2:1, such as, 4:1, at least 10:1, or at least 20:1. The coating 104 can comprise a ratio of electromagnetic radiation scattering at a wavelength of 905 nm and/or 1550 nm to electromagnetic radiation scattering averaged over a wavelength range of 400 nm to 700 nm of 40:1 or lower, such as, 20:1 or lower, 10:1 or lower, or 4:1 or lower. The coating 104 can comprise a ratio of electromagnetic radiation scattering at a wavelength of 905 nm and/or 1550 nm to electromagnetic radiation scattering averaged over a wavelength range of 400 nm to 700 nm of 2:1 to 40:1 such as, 2:1 to 20:1, 2:1 to 10:1, 2:1 to 4:1, 4:1 to 20:1, 4:1 to 10:1, 10:1 to 20:1, or 10:1 to 40:1. The electromangetic radiation absorption, electromangetic radiation scattering, electromangetic radiation extinction, electromangetic radiation transmittance, and electromangetic radiation retroreflectance of the coating 104 can be measured in the cured state of the coating 104.

As used herein, "average over a wavelength range of 400 nm to 700 nm" can include measuring a parameter (e.g., retroreflectance, extinction, absorption, scattering, transmittance) over the wavelength range of 400 nm to 700 nm in 1 nm steps (e.g., 301 total measurements) and then taking an average of the measurements.

The scattering and/or absorption of visible electromagnetic radiation by the coating 104 can affect the observed color of the retroreflective substrate 102. A visible color of the retroreflective substrate 102 with the coating 104 and a visible color of the retroreflective substrate 102 without the coating 104 can be compared to determine a color difference. ΔE. The color difference. ΔE, can be minimized in order to limit observable visible color changes to the retroreflective substrate 102 after deposition of the coating composition to form coating 104.

The color difference. ΔE, can be measured using the International Commission on Illumination L*a*b* (CIELAB) color space. The CIELAB color difference. ΔE, values reported herein are determined using an integrating sphere with D65 Illumination, 10° observer with specular component included according to ASTM E308 unless otherwise stated. The CIELAB color difference. ΔE, is the difference between two colors in the CIELAB color space based on the difference between collected values of L*, a*, and b* according to Equation 1.

$$\Delta E = \sqrt{(\Delta L^*)^2 + (\Delta a^*)^2 + (\Delta b^*)^2} \quad \text{Equation 1}$$

The coating 104 can have a CIELAB color difference. ΔE, of the visible color of the retroreflective substrate without the coating 104 compared to the visible color of the retroreflective substrate with the coating of 25 or lower, such as, 20 or lower, 15 or lower, 10 or lower, 5 or lower, 2 or lower, or 1 or lower, all as measured using an integrating sphere with D65 Illumination, 10° observer with specular component included. The coating 104 can have a CIELAB color difference. ΔE, of the visible color of the retroreflective substrate without the coating 104 compared to the visible color of the retroreflective substrate with the coating 104 of 0 or greater, such as, 1 or greater, 2 or greater, 5 or greater, 10 or greater, 15 or greater, or 20 or greater, all as measured using an integrating sphere with D65 Illumination, 10° observer with specular component included. The coating 104 can have a CIELAB color difference. ΔE, of the visible color of the retroreflective substrate without the coating 104 compared to the visible color of the retroreflective substrate with the coating 104 in a range of 0 to 25, such as, 1 to 20, 1 to 15, 1 to 10, 5 to 10, or 2 to 10, all as measured using an integrating sphere with D65 Illumination, 10° observer with specular component included.

EXAMPLES

The present disclosure will be more fully understood by reference to the following examples, which provide illustrative non-limiting aspects of the invention. It is understood that the invention described in this specification is not necessarily limited to the examples described in this section.

As used herein, the term "Mw" refers to the average molecular weight and means the theoretical value as determined by Gel Permeation Chromatography using Waters 2695 separation module with a Waters 410 differential refractometer (RI detector) and polystyrene standards. The Mw values reported according to the present disclosure were determined using this method. Tetrahydrofuran was used as the eluent at a flow rate of 1 ml min-1, and two PL Gel Mixed C columns were used for separation.

As used herein, the term "parts" refers to parts by weight unless indicated to the contrary.

Example A: Preparation of Acrylic Polymer A

TABLE 1

Polymer A component composition

| Charge | Ingredients | Parts by weight |
|---|---|---|
| #1 | VM&P Naphtha | 431.0 |
| #2 | t-amyl peroxy-2-ethylhexanoate | 22.6 |
|  | butyl acetate | 153.1 |
| #3 | styrene | 452.4 |
|  | 2-ethylhexyl acrylate | 301.6 |
|  | butyl methacrylate | 294.1 |
|  | methyl methacrylate | 271.4 |
|  | hydroxyethyl acrylate | 150.8 |
|  | methacrylic acid | 28.7 |
|  | acrylic acid | 9.0 |
|  | t-dodecyl mercaptan | 19.6 |
| #4 | VM&P Naphtha | 83.5 |
|  | isobutnaol | 27.8 |
| #5 | t-amyl peroxy-2-ethylhexanoate | 7.5 |
|  | VM&P Naphtha | 114.4 |
|  | isobutanol | 41.8 |
| #6 | VM&P Naphtha | 306.2 |
|  | isobutanol | 236.6 |
| #7 | propylene imine | 6.3 |
| #8 | tetraethylene entamine | 6.0 |
| #9 | DESMODUR ® N 3390A BA/SN | 29.0 |
|  | butyl acetate | 50.0 |

To prepare polymer A, charge 1 was added to a round bottom flask equipped with a stirrer, condenser, temperature control system, and two feeding lines under inert gas. The reaction mixture was heated to 126° C. with stirring. Charge 2 was mixed together and added into the reaction mixture over 180 minutes. At the same time, charge 3 was added into the reaction mixture over 180 minutes. When the addition of charge 2 and 3 were completed, charge 4 was used to rinse charge 2 and 3. After addition of charge 4, an additional spike (charge 5) of initiator was added to the reaction mixture over one hour and stirring was continued for one hour at reflux conditions. After completion of stirring charge 6 was added and the reaction mixture was cooled to 60° C. At 60° C., charge 7 was added into reaction mixture and stirring continued for one hour. After completion of stirring, the reaction mixture was cooled to 40° C. At 40° C., charge 8 was added into the reaction mixture and the stirring continued for 10 minutes. After stirring at 40° C., charge 9 was added into reactor over one hour. After addition of charge 9, the reaction mixture was poured out. The solid of acrylic polymer A is 51.5% by weight and the Mw of polymer A is 20000.

Example B: Preparation of Acrylic Polymer B

TABLE 2

Polymer B component composition

| Charge | Ingredients | Parts by weight |
|---|---|---|
| #1 | VM&P Naphtha | 275.7 |
|  | Isobutanol | 214.0 |
| #2 | VAZO 67 2,2'-Azodi(2-methylbutyronitrile) | 9.46 |
|  | Toluene | 155.8 |
| #3 | hydroxyethyl acrylate | 157.2 |
|  | methyl methacrylate | 292.0 |
|  | 2-ethylhexyl acrylate | 314.4 |
|  | butyl methacrylate | 306.6 |
|  | Styrene | 471.6 |

TABLE 2-continued

Polymer B component composition

| Charge | Ingredients | Parts by weight |
|---|---|---|
|  | methacrylic acid | 30.4 |
|  | t-dodecyl mercaptan | 18.4 |
|  | VM&P Naphtha | 3.2 |
| #4 | VM&P Naphtha | 49.8 |
| #5 | VAZO 67 2,2'-Azodi(2-methylbutyronitrile) | 9.4 |
|  | VM&P Naphtha | 147.7 |
| #6 | VM&P Naphtha | 23.2 |
| #7 | VM&P Naphtha | 511.0 |
| #8 | Isobutanol | 118.0 |

To prepare polymer B, charge 1 was added to a round bottom flask equipped with a stirrer, condenser, temperature control system, and two feeding lines under inert gas. 39.30% by weight of charge 2 and 39.30% by weight of charge 3 were added into the reaction mixture of charge 1 at the same time. The reaction mixture was heated to reflux (112° C.) with stirring. The remainder of charge 2 and charge 3 were added into the reaction mixture over two hours separately. After addition of charge 2 and charge 3, charge 4 was used to rinse the feed lines of both charges 2 and 3. At reflux conditions, an additional spike (charge 5) of initiator was added to the reaction mixture over three hours. After addition of charge 5, charge 6 was used to rinse and stirring was continued for 30 minutes at reflux conditions. After stirring completed, heat was off and charge 7 was added into reaction mixture. At 80° C., charge 8 was added into reactor to cool the reaction mixture to 40° C. The solid of acrylic polymer B is 50.8% by weight and the Mw of polymer B is 22000.

Example 1

To prepare coating ATO-1, 2 parts Antimony Tin Oxide (ATO) (e.g., pigment), (SN902SD, Nano Technologies Inc.) were mixed with 8 parts polymer A, 11 parts n-butyl acetate, and 109 parts Zirconox milling media (1-1.2 mm Zirconox milling beads, JYOTI Ceramics.). The mixture was dispersed by shaking in a DAS 200 disperser (Lau GmbH) for four hours, and the milling media was removed by filtering with a 325 μm paper cone filter. Then 4.8 parts of the ATO dispersion was mixed with 5.2 parts TMAC9000FR clearcoat (available from PPG, Pittsburgh, Pennsylvania) (e.g., film-forming resin) to form coating ATO-1 and drawdown on a transparent Mylar film using a #44 wire-wound drawdown bar from RD Specialties, Webster, New York, resulting in a wet film thickness of 4.4 mils (112 μm).

To prepare coating ATO-2, 2 parts ATO (e.g., pigment) were mixed with 8 parts of an acrylic dispersant as described in U.S. Pat. No. 8,129,466 (Synthesis Example A), 12 parts n-butyl acetate, and 45 parts glass beads (2227 Spheriglass, Part number 602498 from Potters Industries, LLC). The mixture was dispersed by shaking in a DAS 200 disperser (Lau GmbH) for 16 hours, and the glass beads were removed by filtering with a 55 μm bag filter (33-NMP 55 X1R-B, Brown and O'Malley Co.). Then, 4.7 parts of the solution was mixed with 5.3 parts TMAC9000FR clearcoat to form coating ATO-2 and drawdown on a transparent Mylar film using a #44 wire-wound drawdown bar from RD Specialties resulting in a wet film thickness of 4.4 mils (112 μm).

Figure 2:
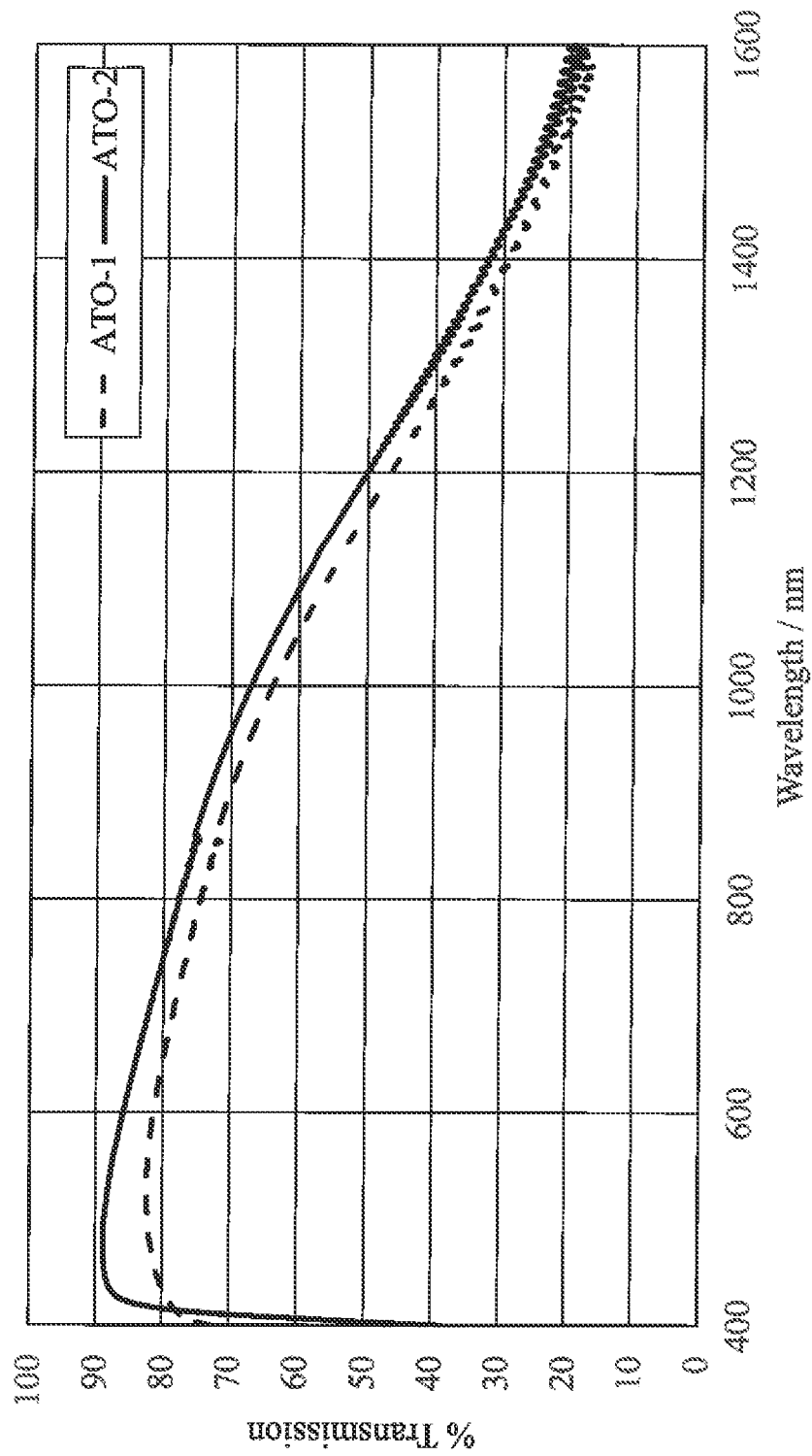
FIG. 2 is a graph depicting transmission spectra for coatings ATO-1 and ATO-2 according to the present disclosure.
Figure 3:
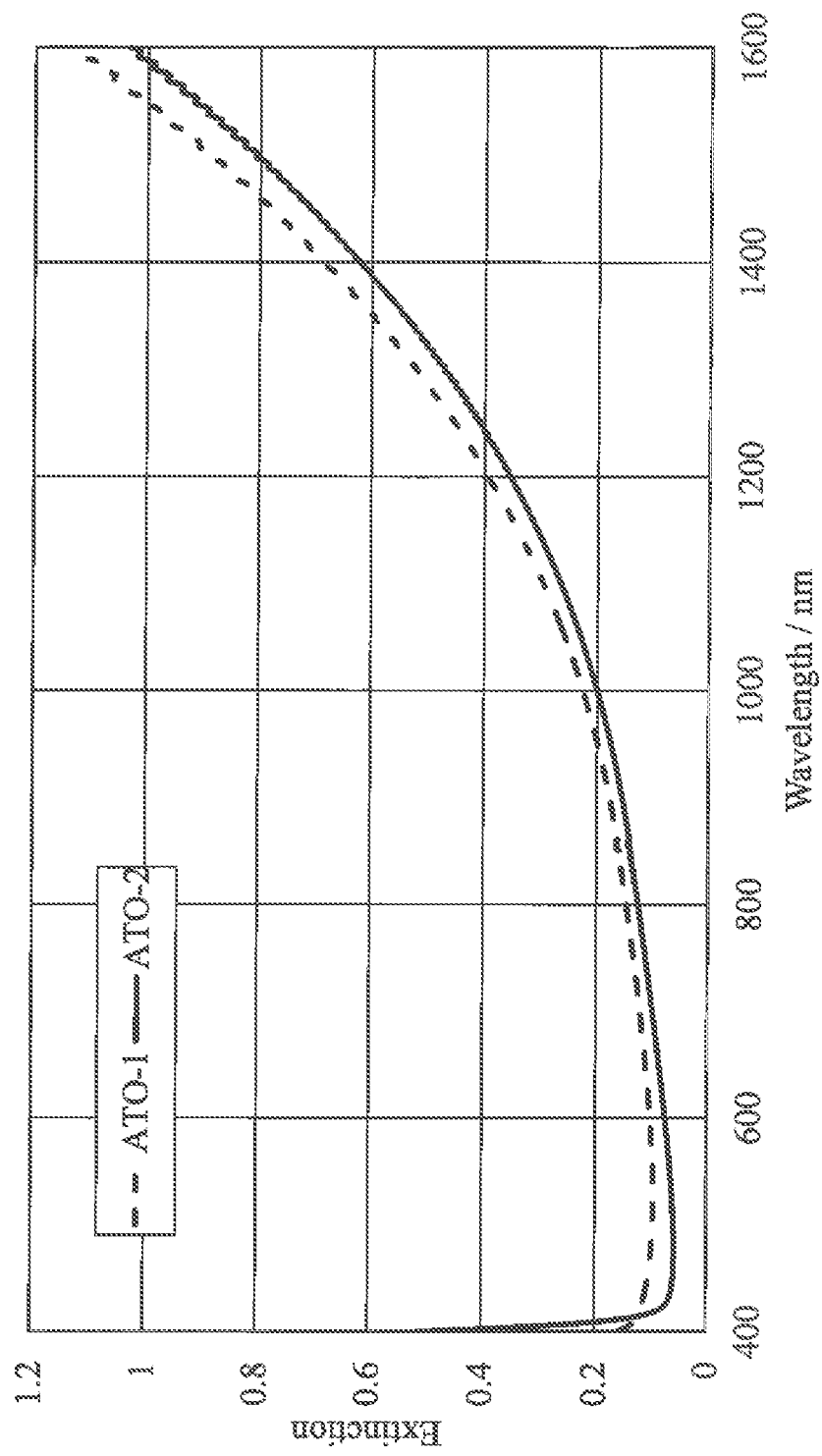
FIG. 3 is a graph depicting extinction spectra for coatings ATO-1 and ATO-2 according to the present disclosure.

The ATO-containing coatings ATO-1 and ATO-2 were tested for transmittance and extinction utilizing a Perkin Elmer Lambda 950UV-Vis NIR spectrometer, and the results of the transmittance are plotted in FIG. 2 and the results of the extinction are plotted in FIG. 3. The coatings ATO-1 and ATO-2 have a strong NIR electromagnetic radiation extinction, including an extinction at 905 nm and 1550 nm. The coatings ATO-1 and ATO-2 reduced 905 nm transmission by 30% and 1550 nm transmission by 80% while maintaining 80%-90% visible transmission averaged over the visible range of the electromagnetic spectrum.

Particle size of the milled ATO was analyzed by dynamic light scattering, using a Nano ZS instrument manufactured by Malvern, Westborough, Massachusetts. ATO-2 was determined to have an average particle size of 43 nm, and ATO-1 was 215 nm. Due to the use of longer grind time, finer media size, and different dispersant, ATO-2 has a smaller particle size than ATO-1.

Extinction was calculated based on percent transmission, and the results are shown in Table 3 herein. Coating ATO-2 has a higher ratio of NIR electromagnetic extinction to visible electromagnetic extinction versus coating ATO-1. The higher ratio suggests that reducing particle size to nanoscale was effective at increasing the ratio of NIR electromagnetic radiation extinction to visible electromagnetic radiation extinction as measured at 905 nm, $Ex_{950}/Ex_{vis}$, and 1550 nm, $Ex_{1550}/Ex_{vis}$. It is believed that a further reduction in particle size may additionally increase the ratio of NIR electromagnetic radiation extinction to visible electromagnetic radiation extinction, and other pigments may exhibit an increase in the ratio of NIR electromagnetic radiation extinction to visible electromagnetic radiation extinction by reducing particle size. It is believed that coatings containing ATO have a reduced NIR transmittance via extinction of NIR electromagnetic radiation.

As used herein, "$Ex_{950}/Ex_{vis}$" is defined to refer to the ratio of electromagnetic radiation extinction at 905 nm to the averaged electromagnetic radiation extinction over the visible range of 400 nm to 700 nm with measurements taken in 1 nm steps. As used herein, "$Ex_{1550}/Ex_{vis}$" is defined to refer to the ratio of electromagnetic radiation extinction at 1550 nm to the averaged electromagnetic radiation extinction over the visible range of 400 nm to 700 nm with measurements taken in 1 nm steps.

Example 2

To prepare coating $LaB_6$-1, 2.2 parts $LaB_6$ (Skysprings Nanomaterials Inc., 99.0+%, average particle size (APS): 50-80 nm) was mixed with 8.5 parts polymer A and 11 parts n-butyl acetate and 109 parts Zirconox milling media (1-1.2 mm Zirconox milling beads, JYOTI Ceramics.). The mixture was dispersed by shaking in a DAS 200 disperser (Lau GmbH) for four hours, and the milling media was removed by filtering with a 325 μm paper cone filter. Then 3 parts of the obtained $LaB_6$ dispersion was mixed with 433 parts TMAC9000FR clearcoat to form coating $LaB_6$-1 and drawdown using a #44 wire-wound drawdown bar from RD Specialties on a transparent Mylar film resulting in a wet film thickness of 4.4 mils (112 μm).

To prepare coating $LaB_6$-2, 2 parts $LaB_6$ (Skysprings Nanomaterials Inc., 99.0+%, APS: 50-80 nm) were mixed with an acrylic dispersant as described in U.S. Pat. No. 8,129,466 (Synthesis Example A), 12 parts n-butyl acetate, and 45 parts glass beads (2227 Spheriglass, Part number 602498 from Potters Industries, LLC). The mixture was dispersed by shaking in a DAS 200 disperser (Lau GmbH) for 16 hours, and the media was removed by filtering with a 55 μm bag filter (33-NMP 55 X1R-B, Brown and O'Malley Co.). Then 2.4 parts of the $LaB_6$ dispersion was mixed with 27.6 parts TMAC9000FR clearcoat to form coating $LaB_6$-2 and drawdown on a transparent Mylar film using a #44 wire-wound drawdown bar from RD Specialties resulting in a wet film thickness of 4.4 mils (112 μm).

Figure 4:
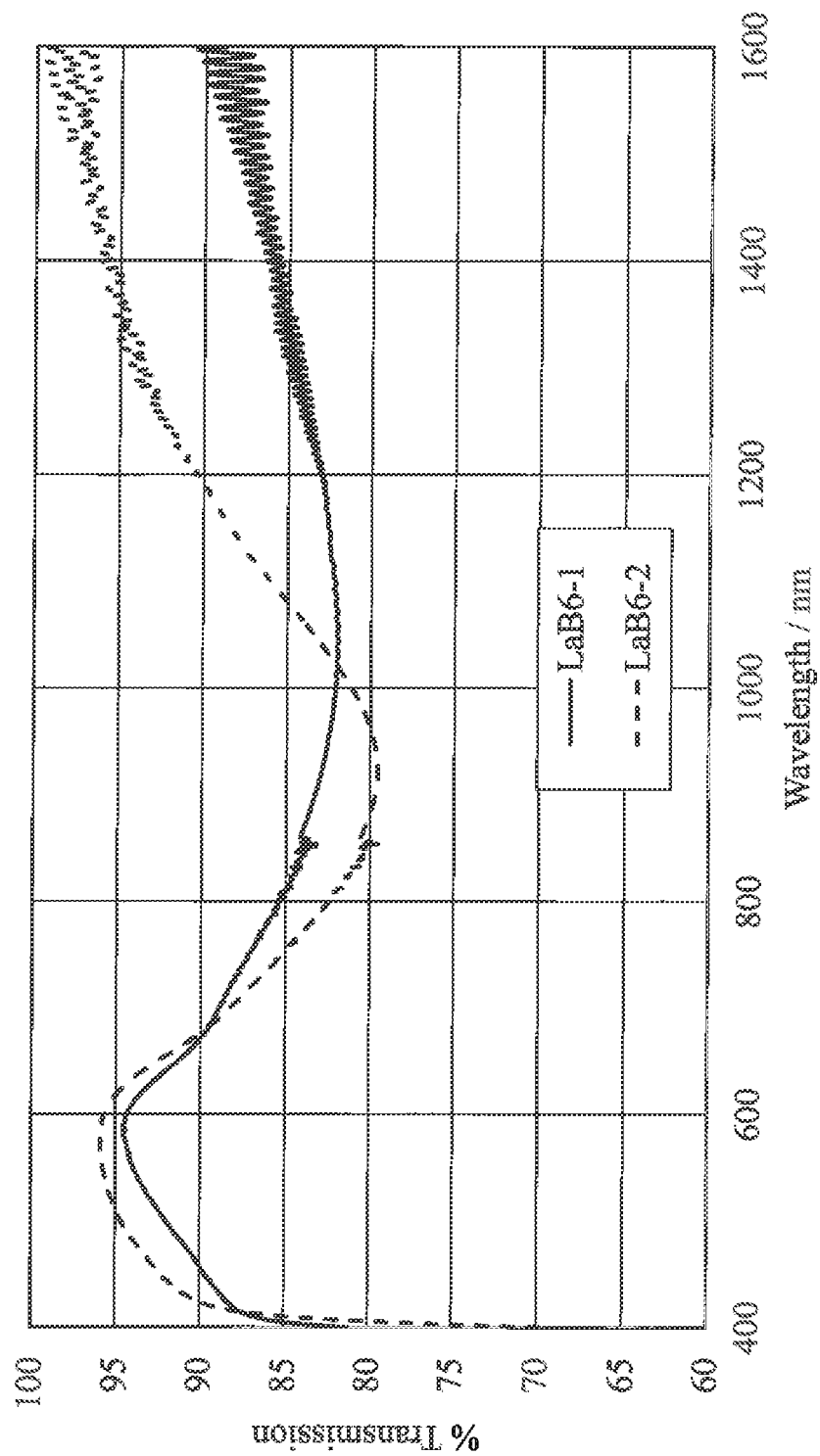
FIG. 4 is a graph depicting transmission spectra for coatings $LaB_6$-1 and $LaB_6$-2 according to the present disclosure.
Figure 5:
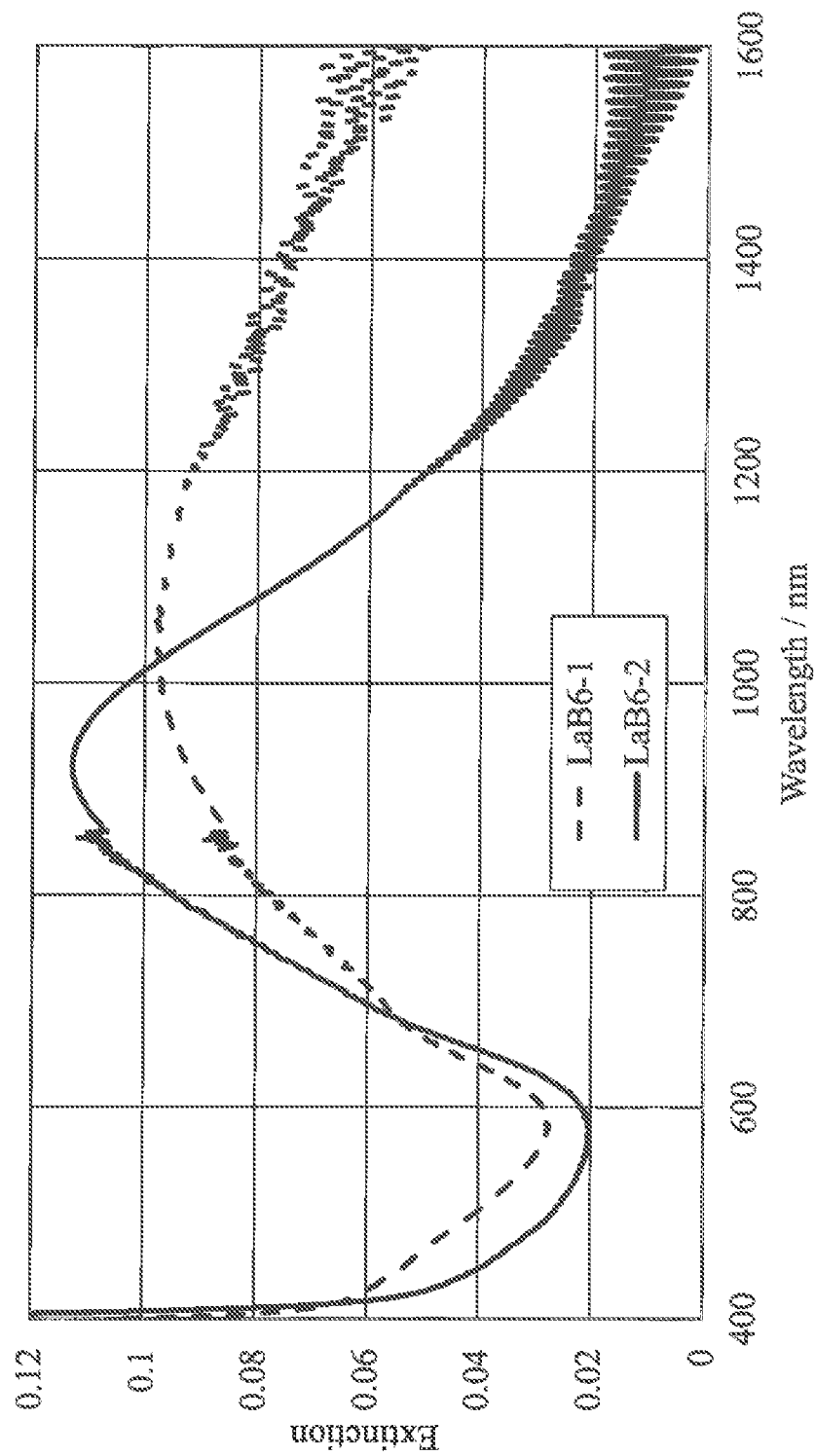
FIG. 5 is a graph depicting extinction spectra for coatings $LaB_6$-1 and $LaB_6$-2 according to the present disclosure.

The $LaB_6$-containing coatings $LaB_6$-1 and $LaB_6$-2 were tested for transmittance and extinction utilizing a Perkin Elmer Lambda 950UV-Vis NIR spectrometer, and the transmittance results are plotted in FIG. 4 and the extinction results are plotted in FIG. 5. $LaB_6$-containing coatings $LaB_6$-1 and $LaB_6$-2 have a strong extinction near 905 nm. Due to the use of longer grind time, finer media size and different dispersant, coating $LaB_6$-2 has a smaller particle size than coating $LaB_6$-1. Dynamic light scattering measurement, using a Nano ZS instrument, shows that $LaB_6$-2 has an average particle size of 119 nm, much smaller than $LaB_6$-1 with 2401 nm particles. As shown in Table 1, coating $LaB_6$-2 had a higher ratio of NIR electromagnetic radiation extinction to visible electromagnetic radiation extinction than coating $LaB_6$-1. Similar to the case of ATO, the result demonstrates that reducing the particle size to nanoscale increases the ratio of NIR electromagnetic radiation extinction to visible electromagnetic radiation extinction as measured at 905 nm, $Ex_{950}/Ex_{vis}$, and 1550 nm, $Ex_{1550}/Ex_{vis}$.

The $LaB_6$-2 films reduced 905 nm transmission by 20% while maintaining more than 90% (10% reduction) visible transmission. Coating $LaB_6$-2 resulted in a ratio of reduction in NIR transmittance (e.g., LIDAR signal wavelength) to visible transmittance of 2. It is believed that coatings containing $LaB_6$ reduce the NIR transmittance via extinction of NIR electromagnetic radiation.

TABLE 3

Extinction of $LaB_6$ and ATO-containing samples

| Sample | Averaged extinction in visible (400-700 nm) | Extinction at 905 nm | Extinction at 1550 nm | 905 nm extinction/ averaged extinction in visible | 1550 nm extinction/ averaged extinction in visible |
|---|---|---|---|---|---|
| ATO-1 | 0.11 | 0.18 | 1.01 | 1.70 | 9.59 |
| ATO-2 | 0.08 | 0.16 | 0.92 | 1.91 | 11.23 |
| $LaB_6$-1 | 0.04 | 0.09 | 0.008 | 2.08 | 0.19 |
| $LaB_6$-2 | 0.04 | 0.11 | 0.015 | 3.05 | 0.43 |

Example 3

1.5 part $LaB_6$ powder (e.g., pigment) (Skysprings Nanomaterials Inc., 99.0+%, APS: 50-80 nm) was mixed with 5 parts acrylic resin as described in U.S. Pat. No. 8,129,466 (Synthesis Example A), 45 parts glass beads (2227 Spheriglass, Part number 602498 from Potters Industries, LLC), and 15 parts n-butyl acetate. The mixture was dispersed in a DAS 200 disperser (Lau GmbH) for 16 hours, and the glass beads were removed by filtering with a 55 μm bag filter (33-NMP 55 X1R-B, Brown and O'Malley Co.) to form a $LaB_6$ dispersion.

6 parts of the $LaB_6$ dispersion were mixed with 88 parts DC2000 refinish clearcoat (available from PPG, Pittsburgh, Pennsylvania) and 6 parts n-butyl acetate to formulate a coating $LaB_6$-3. 8 parts of $LaB_6$ dispersion were mixed with 86 parts DC2000 refinish clearcoat and 5 parts n-butyl acetate to formulate a coating $LaB_6$-4. Liquid coating $LaB_6$-3 and $LaB_6$-4 were each applied on a retroreflective sheet (Nikkalite 92802) by drawdown using a #44 wire-wound drawdown bar from RD Specialties resulting in a wet film thickness of 4.4 mils (112 μm). The coatings $LaB_6$-3 and LaB$_6$-4 were each cured on the respective retroreflective sheet at ambient conditions and were tested for LIDAR signal intensity and retroreflectivity. The LIDAR signal was tested with a LeddarVu 8 solid state LIDAR, which utilizes 905 nm NIR light source. The LIDAR signal was read at 10 m detector-to-sample distance with laser intensity setting at 6%. The visible retroreflectance (reflectivity) was evaluated with a 922 RoadVista retroreflectometer which is ASTM E1709 compliant.

For coating LaB$_6$-3 (e.g., contains 0.9% by weight LaB$_6$), the reduction in LIDAR signal is 44% while visible retroreflectance is maintained at 92% (8% reduction) with respect to uncoated retroreflective sheet. Coating LaB$_6$-3 resulted in a ratio of reduction in NIR retroreflectance (e.g., LIDAR signal) to visible retroreflectance of 5.5. For coating LaB$_6$-4 (e.g., contains 1.2% by weight LaB$_6$), the reduction in LIDAR signal is 60% while visible retroreflectance is maintained at 88% (12% reduction) with respect to the uncoated retroreflective sheet. Coating LaB$_6$-3 resulted in a ratio of reduction in NIR retroreflectance (e.g., LIDAR signal) to visible retroreflectance of 5.

Comparative Example 4

To produce comparative coating Ep-1 (e.g., containing 0.08% by weight Epolight 5547 dye), 1 part Epolight 5547 dye was dissolved in 99 parts methyl amyl ketone. Epolight 5547 dye comprises a phthalocyanine dye. Then, 4 parts Epolight 5547 dye solution was mixed with 96 parts DC2000 liquid clearcoat. The coating mixture was applied on a retroreflective sheet (Nikkalite 92802) via drawdown using a #44 wire-wound drawdown bar from RD Specialties resulting in a wet film thickness of 4.4 mils (112 µm). Comparative coating EP-1 was cured on the retroreflective sheet at ambient conditions and was tested for LIDAR signal intensity and retroreflectivity.

Comparative coating Ep-1 reduces 33% LIDAR signal while visible retroreflectance is maintained at 100% with respect to the uncoated retroreflective sheet. Comparative coating Ep-1 resulted in a ratio of reduction in NIR retroreflectance (e.g., LIDAR signal) to visible retroreflectance of greater than 50.

Example 5

Coating A1-1 was prepared and tested for a ratio of reduction in NIR retroreflectance (e.g., LIDAR signal) to visible retroreflectance. 11 parts Alumina powder (5 um spherical particles, 26R-8505, Inframat) (e.g., pigment) was mixed with 7.5 parts acrylic resin Polymer B and 11 parts n-butyl acetate solvent. The mixture was stirred for 20 minutes to obtain an alumina dispersion.

3 parts alumina dispersion was mixed with 97 parts DC2000 clearcoat, and the mixture was drawdown on a retroreflective sheet using a #44 wire-wound drawdown bar from RD Specialties. Coating A1-1 was cured on the retroreflective sheet at ambient conditions and was tested for LIDAR signal intensity and retroreflectivity.

Coating A1-1 reduces LIDAR signal by 23% while visible retroreflectance is maintained at 94% (6% reduction) with respect to the uncoated retroreflective sheet. Coating A1-1 resulted in a ratio of reduction in NIR retroreflectance (e.g., LIDAR signal) to visible retroreflectance of 3.9. It is believed that coating A1-1 reduced the NIR retroreflectance via scattering of NIR electromagnetic radiation.

Example 6

To produce coating Au-1, 50 parts aqueous dispersion of Au nanorods (0.035 mg/mL, A12-10-900-CTAB, Nanopartz) was mixed with 1 part resin (U.S. Pat. No. 9,598,597 Example 1). The solution was drop-cast onto a Mylar substrate. Coating Au-1 was cured on the retroreflective sheet at ambient conditions.

Figure 6:
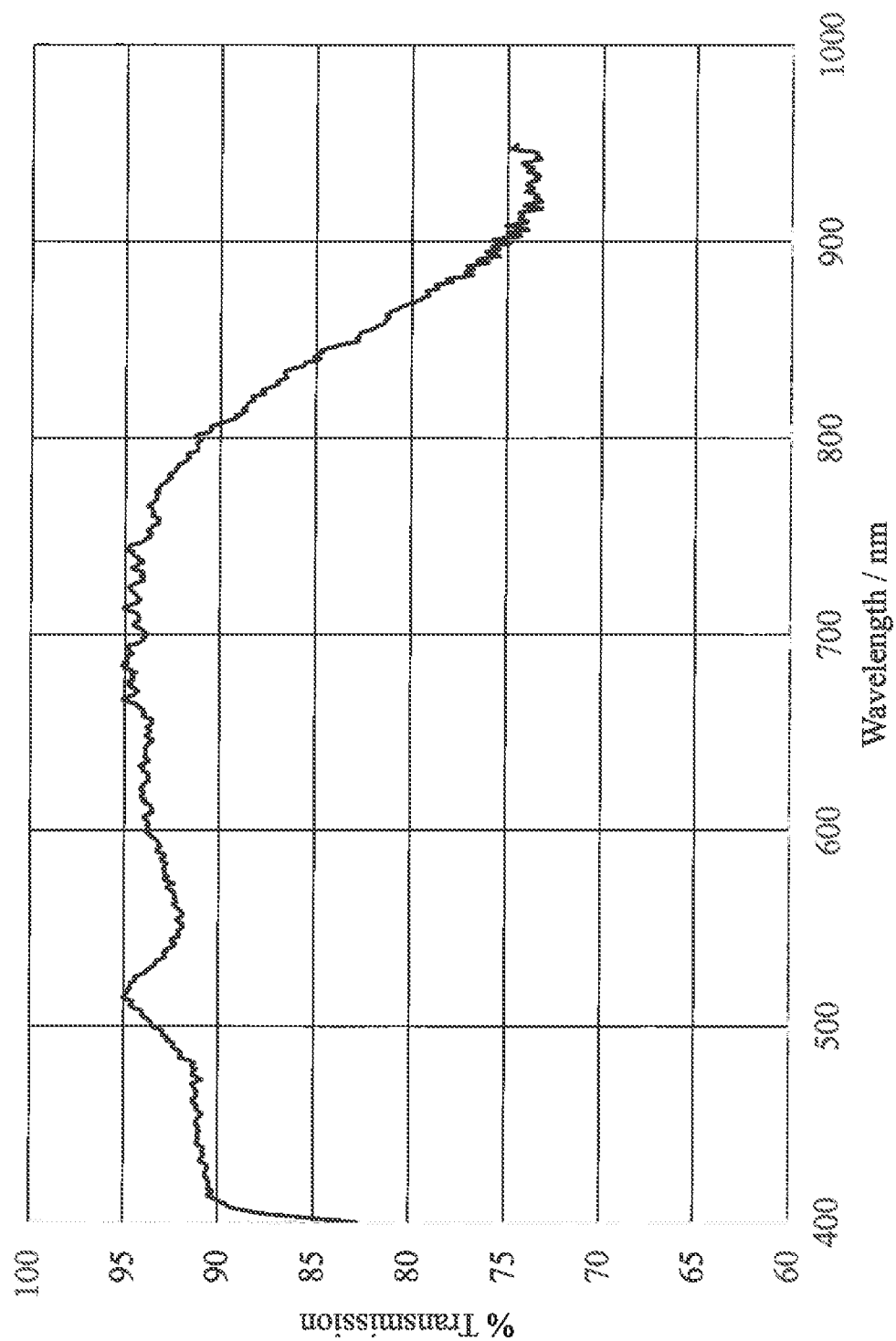
FIG. 6 is a graph depicting a transmission spectrum for coating Au-1 according to the present disclosure.

Coating Au-1 was tested for transmittance utilizing a Vernier Go Direct SpectroVis Plus spectrometer, and the transmittance results are plotted in FIG. 6. The NIR transmission drops to 75% (25% reduction) and visible transmission is above 90% (10% reduction). The coating Au-1 containing Au nanorods results in a ratio of reduction in NIR transmittance (e.g., LIDAR signal wavelength) to visible transmittance of greater than 2.5.

Example 7

Figure 7:
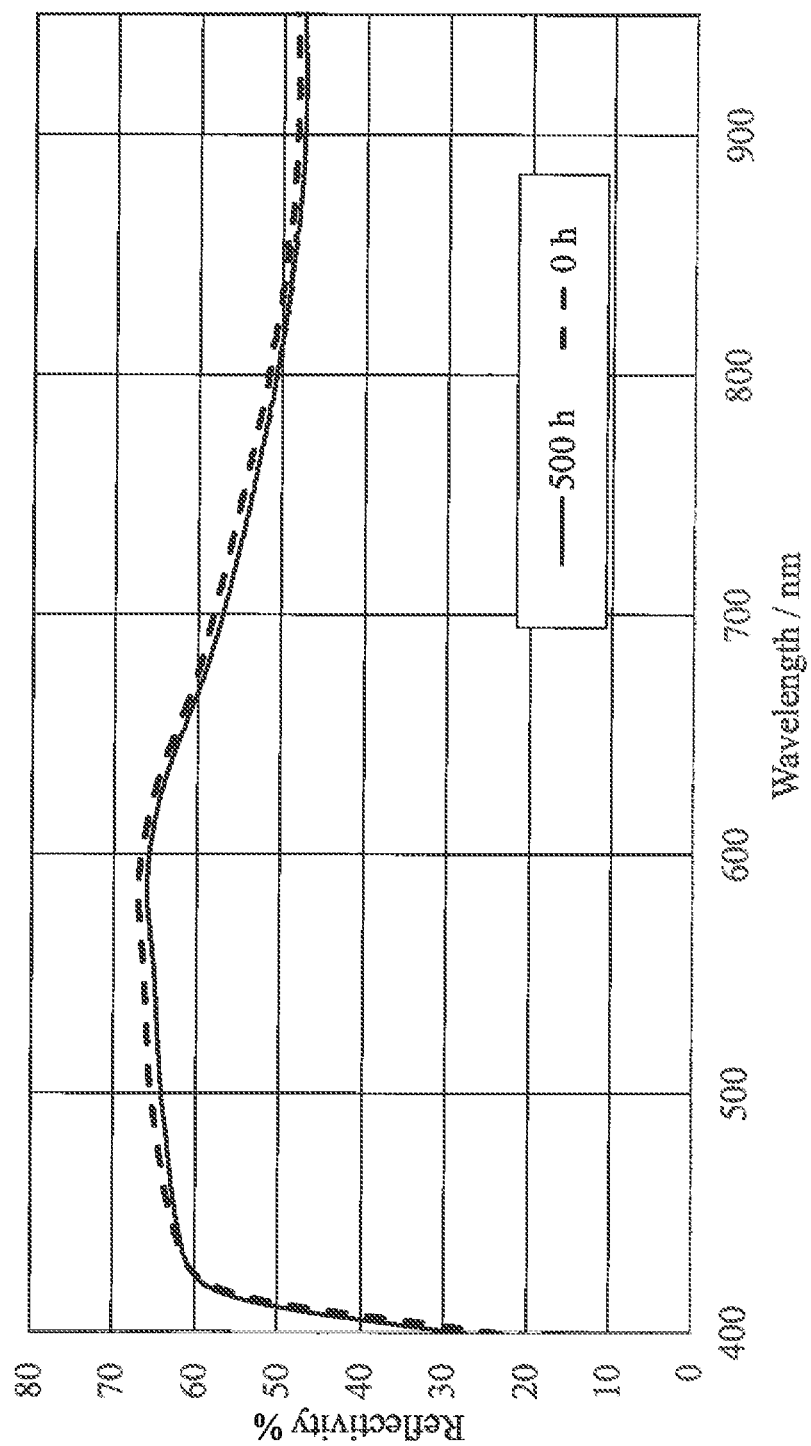
FIG. 7 is a graph illustrating reflectivity spectra for coating $LaB_6$-2 deposited on a white colored aluminum panel according to the present disclosure.

Coating LaB$_6$-2 and comparative coating Ep-1 were tested for weather-ability. The coatings were cured on a white colored aluminum panel (Tru aluminum 04X12X038, unpolished, white, APT33676, Batch: 20814216, ACT Laboratories Inc.) and placed into a weather-o-meter (following SAE J2527) for 250 to 500 hours. Then, the film was tested for reflectivity utilizing a Perkin Elmer Lambda 950UV-Vis NIR spectrometer. The NIR electromagnetic radiation extinction of the comparative coating Ep-1 containing films deteriorated quickly such that after 250 h, no pronounced electromagnetic radiation extinction can be seen in the NIR. After 500 hours of weathering, coating LaB$_6$-2 did not have an observable NIR electromagnetic radiation extinction signal deterioration as shown in FIG. 7. It is believed that the pigment in LaB$_6$-2 enables the enhanced weather resistance as compared to comparative coating Ep-1 which contains a dye.

Example 8

Coating LaB$_6$-2 was sprayed over stop signs (engineering-grade official MUTCD stop signs, RoadTrafficSigns.com). A stainless steel substrate was sprayed at the same time for determination of dry film thickness with a Deltascope MP30.

An integrating sphere spectrophotometer (Minolta CM-3600d) with D65 Illumination, 10° observer with specular component included according to ASTM E308 was used to evaluate the color difference. CIELAB ΔE, of the coating LaB$_6$-2. Values of ΔE were calculated according to Equation 1 and are shown in Table 4.

TABLE 4

Color measurement of coated stop signs

| Measured part | LaB$_6$ concentration | Coating thickness (µm) | ΔE | % reduction in NIR retroreflectance (LIDAR signal intensity) |
|---|---|---|---|---|
| White Letter | 1.2% | 10 | 13.54 | 50% |
|  | 1.2% | 23 | 21.28 | 70% |
| Red Background | 1.2% | 10 | 12.00 | 50% |
|  | 1.2% | 23 | 20.18 | 70% |

As shown in Table 3, coating LaB$_6$-2 reduced the NIR retroreflectance of the retroreflective substrate and maintained a sufficient level of visible retroreflectance and as shown in Table 4. The coating LaB$_6$-2 did not significantly alter the color of the substrate (e.g., stop sign). It is believed that other coatings formulations according to the present disclosure also can achieve a reduction in NIR retroreflectance, can maintain a sufficient level of visible retroreflectance, and may not significantly alter the color of the underlying layers or substrate.

One skilled in the art will recognize that the herein described compositions, articles, methods, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various examples have been described herein, many modifications, variations, substitutions, changes, and equivalents to those examples may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed examples. The following claims are intended to cover all such modification and variations.

Various aspects of the invention according to the present disclosure include, but are not limited to, the aspects listed in the following numbered clauses.

1. A coating composition for application over a retroreflective substrate, comprising:
   a resin; and
   a pigment suitable to absorb and/or scatter electromagnetic radiation in a wavelength range of 800 nm to 2000 nm;
   wherein a coating formed from the coating composition comprises a ratio of reduction in electromagnetic radiation retroreflectance at a wavelength of 905 nm and/or 1550 nm to reduction in electromagnetic radiation retroreflectance averaged over a wavelength range of 400 nm to 700 nm of at least 2:1.

2. The coating composition of clause 1, wherein the coating comprises a ratio of reduction in electromagnetic radiation retroreflectance at a wavelength of 905 nm and/or 1550 nm to reduction in electromagnetic radiation retroreflectance averaged over a wavelength range of 400 nm to 700 nm of at least 4:1.

3. The coating composition of any one of clauses 1-2, wherein the coating comprises a ratio of electromagnetic radiation extinction at a wavelength of 905 nm and/or 1550 nm to electromagnetic radiation extinction averaged over a wavelength range of 400 nm to 700 nm of at least 2:1.

4. The coating composition of any one of clauses 1-3, wherein the coating comprises a ratio of electromagnetic radiation extinction at a wavelength of 905 nm and/or 1550 nm to electromagnetic radiation extinction averaged over a wavelength range of 400 nm to 700 nm of at least 4:1.

5. The coating composition of any one of clauses 1-4, wherein the coating comprises a ratio of electromagnetic radiation absorption at a wavelength of 905 nm and/or 1550 nm to electromagnetic radiation absorption averaged over a wavelength range of 400 nm to 700 nm of at least 2:1.

6. The coating composition of any one of clauses 1-5, wherein the coating comprises a ratio of electromagnetic radiation scattering at a wavelength of 905 nm and/or 1550 nm to electromagnetic radiation scattering averaged over a wavelength range of 400 nm to 700 nm of at least 2:1.

7. The coating composition of any one of clauses 1-6, wherein the pigment comprises at least one of zinc oxide, alumina, antimony tin oxide, tungsten oxide, gold nanoparticles, silver nanoparticles, copper nanoparticles, lanthanum hexaboride, dicopper hydroxide phosphate, and a phthalocyanine.

8. The coating composition of any one of clauses 1-7, wherein the pigment comprises lanthanum hexaboride.

9. The coating composition of any one of clauses 1-8, wherein the pigment comprises an average particle size of 1 nm to 5000 nm.

10. The coating composition of any one of clauses 1-9, wherein the pigment comprises an average particle size of 10 nm to 150 nm.

11. The coating composition of any one of clauses 1-10, wherein the coating absorbs at least 0.1 absorbance units of electromagnetic radiation at a wavelength of 905 nm.

12. The coating composition of any one of clauses 1-11, wherein the coating absorbs at least 0.2 absorbance units of electromagnetic radiation at a wavelength of 1550 nm.

13. A system comprising:
    the coating composition of any one of clauses 1-12 disposed over a retroreflective substrate, wherein the system comprises a CIELAB color difference. ΔE, of 25 or less when compared to the retroreflective substrate without the coating, as measured using an integrating sphere with D65 Illumination, 10° observer with specular component included.

14. The system of clause 13, wherein the retroreflective substrate comprises at least one of a tape, a sign, a vehicle, a marker, and clothing.

15. The coating composition of any one of clauses 1-12 and/or the system of any one of clauses 13-14, wherein the resin comprises at least one of a thermosetting film-forming resin and a thermoplastic film-forming resin.

16. The coating composition of any one of clauses 1-12 and 15 and/or the system of any one of clauses 13-14, wherein the resin further comprises at least one of acrylic polymers, polyester polymers, polyurethane polymers, polyamide polymers, polyether polymers, polysiloxane polymers, copolymers thereof, and mixtures thereof.

17. The coating composition of any one of clauses 1-12 and 15-16 and/or the system of any one of clauses 13-14, wherein the coating transmits 80 percent or less of electromagnetic radiation at a wavelength of 905 nm.

18. A method for producing a retroreflective article with reduced electromagnetic radiation retroreflection at a wavelength of 905 nm and/or 1550 nm, the method comprising:
depositing a coating composition over a retroreflective substrate to form a coating, the coating composition comprising:
a resin; and
a pigment suitable to absorb and/or scatter electromagnetic radiation in a wavelength range of 800 nm to 2000 nm;
wherein the coating comprises a ratio of reduction in electromagnetic radiation retroreflectance at a wavelength of 905 nm and/or 1550 nm to reduction in electromagnetic radiation retroreflectance averaged over a wavelength range of 400 nm to 700 nm of at least 2:1.

19. A retroreflective article comprising:
a retroreflective substrate; and
a coating disposed over the retroreflective substrate, the coating comprising:
a resin; and
a pigment suitable to absorb and/or scatter electromagnetic radiation in a wavelength range of 800 nm to 2000 nm;
wherein the coating comprises a ratio of reduction in electromagnetic radiation retroreflectance at a wavelength of 905 nm and/or 1550 nm to reduction in electromagnetic radiation retroreflectance averaged over a wavelength range of 400 nm to 700 nm of at least 2:1.

20. The article of clause 19, wherein the retroreflective substrate comprises at least one of a tape, a sign, a vehicle, a marker, and clothing.

21. A coating composition for application over a retroreflective substrate, comprising:
a resin; and
a pigment suitable to absorb and/or scatter electromagnetic radiation in a wavelength range of 800 nm to 2000 nm;
wherein a coating formed from the coating composition comprises a ratio of electromagnetic radiation extinction at a wavelength of 905 nm and/or 1550 nm to electromagnetic radiation extinction averaged over a wavelength range of 400 nm to 700 nm of at least 2:1.

22. The coating composition of clause 21, wherein the coating comprises a ratio of electromagnetic radiation extinction at a wavelength of 905 nm and/or 1550 nm to electromagnetic radiation extinction averaged over a wavelength range of 400 nm to 700 nm of at least 4:1.

23. The coating composition of any one of clauses 21-22, wherein the coating comprises a ratio of electromagnetic radiation absorption at a wavelength of 905 nm and/or 1550 nm to electromagnetic radiation absorption averaged over a wavelength range of 400 nm to 700 nm of at least 2:1.

24. The coating composition of any one of clauses 21-23, wherein the coating comprises a ratio of electromagnetic radiation absorption at a wavelength of 905 nm and/or 1550 nm to electromagnetic radiation absorption averaged over a wavelength range of 400 nm to 700 nm of at least 4:1.

25. The coating composition of any one of clauses 21-24, wherein the coating comprises a ratio of electromagnetic radiation scattering at a wavelength of 905 nm and/or 1550 nm to electromagnetic radiation extinction averaged over a wavelength range of 400 nm to 700 nm of at least 2:1.

26. The coating composition of any one of clauses 21-25, wherein the pigment comprises at least one of zinc oxide, alumina, antimony tin oxide, tungsten oxide, gold nanoparticles, silver nanoparticles, copper nanoparticles, lanthanum hexaboride, dicopper hydroxide phosphate, and a phthalocyanine.

27. The coating composition of any one of clauses 21-26, wherein the pigment comprises lanthanum hexaboride.

28. The coating composition of any one of clauses 21-27, wherein the pigment comprises an average particle size of 1 nm to 5000 nm.

29. The coating composition of any one of clauses 21-28, wherein the pigment comprises an average particle size of 10 nm to 150 nm.

30. The coating composition of any one of clauses 21-29, wherein the coating absorbs at least 0.1 absorbance units of electromagnetic radiation at a wavelength of 905 nm.

31. The coating composition of any one of clauses 21-30, wherein the coating absorbs at least 0.2 absorbance units of electromagnetic radiation at a wavelength of 1550 nm.

32. A system comprising:
the coating composition of any one of clauses 21-31 disposed over a retroreflective substrate, wherein the system comprises a CIELAB color difference, $\Delta E$, of 25 or less when compared to the retroreflective substrate without the coating, as measured using an integrating sphere with D65 Illumination, 10° observer with specular component included.

33. The system of clause 32, wherein the retroreflective substrate comprises at least one of a tape, a sign, a vehicle, a marker, and clothing.

34. The coating composition of any one of clauses 21-31 and/or the system of any one of clauses 32-33, wherein the resin comprises at least one of a thermosetting film-forming resin and a thermoplastic film-forming resin.

35. The coating composition of any one of clauses 21-31 and 34 and/or the system of any one of clauses 32-33, wherein the resin further comprises at least one of acrylic polymers, polyester polymers, polyurethane polymers, polyamide polymers, polyether polymers, polysiloxane polymers, copolymers thereof, and mixtures thereof.

36. The coating composition of clauses 21-31 and 34-35 and/or the system of any one of clauses 32-33, wherein the coating transmits 80 percent or less of electromagnetic radiation at a wavelength of 905 nm.

37. A method for producing a retroreflective article with increased electromagnetic radiation extinction at a wavelength of 905 nm and/or 1550 nm, the method comprising:
depositing a coating composition over a retroreflective substrate to form a coating, the coating composition comprising:
a resin; and
a pigment suitable to absorb and/or scatter electromagnetic radiation in a wavelength range of 800 nm to 2000 nm;
wherein the coating comprises a ratio of electromagnetic radiation extinction at a wavelength of 905 nm and/or 1550 nm to electromagnetic radiation extinction averaged over a wavelength range of 400 nm to 700 nm of at least 2:1.

38. A retroreflective article comprising:
a retroreflective substrate; and
a coating disposed over the retroreflective substrate, the coating comprising:
a resin; and
a pigment suitable to absorb and/or scatter electromagnetic radiation in a wavelength range of 800 nm to 2000 nm;
wherein the coating comprises a ratio of electromagnetic radiation extinction at a wavelength of 905 nm and/or 1550 nm to electromagnetic radiation extinction averaged over a wavelength range of 400 nm to 700 nm of at least 2:1.

39. The article of clause 38, wherein the retroreflective substrate comprises at least one of a tape, a sign, a vehicle, a marker, and clothing.

Various features and characteristics are described in this specification to provide an understanding of the composition, structure, production, function, and/or operation of the invention, which includes the disclosed compositions, coatings, and methods. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with the written description, sufficiency of description, and added matter requirements.

Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameters.

Notwithstanding that numerical ranges and parameters setting forth the broad scope of the invention are approximations, numerical values are set forth in the specific examples are reported precisely as possible. Any numerical value, however, inherently contains certain errors necessarily resulting from the standard variation found in their respective testing measurements.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, coating, or method that "comprises," "has," "includes," or "contains" one or more features and/or characteristics possesses those one or more features and/or characteristics but is not limited to possessing only those one or more features and/or characteristics. Likewise, an element of a composition, coating, or process that "comprises," "has," "includes," or "contains" one or more features and/or characteristics possesses those one or more features and/or characteristics but is not limited to possessing only those one or more features and/or characteristics and may possess additional features and/or characteristics.

The grammatical articles "a," "an," and "the," as used in this specification, including the claims, are intended to include "at least one" or "one or more" unless otherwise indicated. Thus, the articles are used in this specification to refer to one or more than one (i.e., to "at least one") of the grammatical objects of the article. By way of example, "a component" means one or more components, and thus, possibly more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

Any patent, publication, or other document identified in this specification is incorporated by reference into this specification in its entirety unless otherwise indicated but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with the written description, sufficiency of description, and added matter requirements.

Whereas particular examples of this invention have been described above for purposes of illustration, it will be evident to those skilled in the art that numerous variations of the details of the present invention may be made without departing from the invention as defined in the appended claims.

While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A method for producing a retroreflective article with reduced electromagnetic radiation retroreflection at a wavelength of 905 nm and/or 1550 nm, the method comprising:
depositing a coating composition over a retroreflective substrate to form a coating on the retroreflective substrate and thereby the retroreflective article, the coating composition comprising:
a film-forming resin; and
a pigment suitable to absorb and/or scatter electromagnetic radiation in a wavelength range of 800 nm to 2000 nm;
wherein the coating comprises a ratio of reduction in electromagnetic radiation retroreflectance at a wavelength of 905 nm and/or 1550 nm to reduction in electromagnetic radiation retroreflectance averaged over a wavelength range of 400 nm to 700 nm of at least 2:1.

2. The method of claim 1, wherein the depositing is performed on-site.

3. The method of claim 1, wherein the depositing is performed during manufacture of the retroreflective article.

4. The method of claim 1, wherein the depositing comprises at least one of spray coating, spin coating, dip coating, roll coating, flow coating, and film coating.

5. The method of claim 1, further comprising curing the coating composition to form the coating.

6. The method of claim 1, wherein the deposition is performed such that a dry film thickness of the coating composition is in a range of 0.2 um to 500 um.

7. The method of claim 1, wherein the coating composition is deposited directly on the retroreflective substrate.

8. The method of claim 1, wherein the coating composition is deposited on an underlying layer on the retroreflective substrate.

9. The method of claim 1, wherein the retroreflective article further comprises a clear coat, a primer, or a combination thereof.

10. The method of claim 1, wherein the retroreflective article comprises at least one of a tape, a sign, a vehicle, a marker, and clothing.

11. The method of claim 10, wherein the retroreflective article comprises the sign and the sign comprises at least one of a stop sign, a yield sign, and a one-way sign.

12. The method of claim 10, wherein the retroreflective article comprises the marker and the marker comprises at least one of a barrier, a barricade, a speed bump, a traffic cone, and a road surface.

13. The method of claim 10, wherein the retroreflective article comprises the vehicle and the vehicle comprises at least one of an automobile, a bicycle, a truck, a bus, an airplane, a boat, a drone, and a submarine.

14. The method of claim 1, wherein the coating composition is manufactured into a preformed film and the preformed film is deposited over the retroreflective substrate.

15. The method of claim 1, wherein the coating comprises a ratio of reduction in electromagnetic radiation retroreflectance at a wavelength of 905 nm and/or 1550 nm to reduction in electromagnetic radiation retroreflectance averaged over a wavelength range of 400 nm to 700 nm of at least 4:1.

16. The method of claim 1, wherein the coating absorbs at least 0.1 absorbance units of electromagnetic radiation at a wavelength of 905 nm, the coating absorbs at least 0.2 absorbance units of electromagnetic radiation at a wavelength of 1550 nm, or a combination thereof.

17. The method of claim 1, wherein the pigment comprises at least one of zinc oxide, alumina, antimony tin oxide, tungsten oxide, gold nanoparticles, silver nanoparticles, copper nanoparticles, lanthanum hexaboride, dicopper hydroxide phosphate, and a phthalocyanine.

18. The method of claim 1, wherein the pigment comprises an average particle size of 1 nm to 5000 nm.

19. The method of claim 1, wherein the film-forming resin comprises at least one of a thermosetting film-forming resin and a thermoplastic film-forming resin.

20. The method composition of claim 1, wherein the coating transmits 80 percent or less of electromagnetic radiation at a wavelength of 905 nm.

* * * * *